United States Patent
Inoue et al.

(10) Patent No.: US 7,357,964 B2
(45) Date of Patent: Apr. 15, 2008

(54) LIQUID-CRYSTALLINE VINYL KETONE DERIVATIVES AND THEIR POLYMERS

(75) Inventors: Hiromichi Inoue, Ichihara (JP); Ryushi Syundo, Ichihara (JP); Kazutoshi Miyazawa, Ichihara (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 381 days.

(21) Appl. No.: 10/664,671

(22) Filed: Sep. 17, 2003

(65) Prior Publication Data

US 2005/0012070 A1 Jan. 20, 2005

(30) Foreign Application Priority Data

Oct. 15, 2002 (JP) ............................ 2002-300068
Jul. 18, 2003 (JP) ............................ 2003-198974

(51) Int. Cl.
C09K 19/52 (2006.01)
C09K 19/38 (2006.01)
C07C 49/21 (2006.01)
C07C 49/203 (2006.01)
C07C 49/213 (2006.01)
C08F 12/20 (2006.01)
C08F 16/36 (2006.01)

(52) U.S. Cl. ............ 428/1.1; 252/299.61; 252/299.62; 252/299.63; 252/299.67; 252/299.01; 252/299.66; 568/308; 525/328.6; 526/244; 526/316

(58) Field of Classification Search ........... 252/299.01, 252/299.61, 299.62, 299.63, 299.66, 299.67; 428/1.1; 568/308; 525/328.6; 526/244, 526/316

See application file for complete search history.

(56) References Cited

U.S. PATENT DOCUMENTS

| | | | | |
|---|---|---|---|---|
| 3,285,997 | A * | 11/1966 | Rubens ...................... | 525/292 |
| 3,340,233 | A * | 9/1967 | Leavitt ...................... | 526/284 |
| 4,452,718 | A * | 6/1984 | Schadt et al. ............ | 252/299.61 |
| 5,368,770 | A * | 11/1994 | Saupe et al. ............. | 252/299.01 |
| 5,798,057 | A | 8/1998 | Hikmet ..................... | 252/299.5 |
| 5,863,457 | A | 1/1999 | Hasebe et al. .......... | 252/299.01 |
| 6,440,328 | B1 * | 8/2002 | Stanjek et al. .......... | 252/299.67 |

FOREIGN PATENT DOCUMENTS

JP 05-112778 * 5/1993
JP 07-017910 1/1995
JP 09-316032 12/1997

OTHER PUBLICATIONS

CAPLUS 1995: 278549.*
CAPLUS 1985: 15555.*
CAPLUS 1967: 491254.*
CAPLUS 1989: 145,504.*
CAPLUS 2001: 180,900.*
CAPLUS 1973: 536255.*
CAPLUS 2000:772323.*
English abstract for JP 05-112778.*
CAPLUS 1994: 285205.*
CAPLUS 1967: 489834.*

* cited by examiner

Primary Examiner—Shean C Wu
(74) Attorney, Agent, or Firm—J.C. Patents

(57) ABSTRACT

Provided is a liquid-crystalline, polymerizable vinyl ketone compound of formula (1):

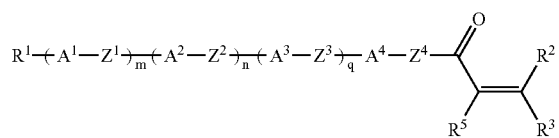

(1)

Preferably, $R^1$ is hydrogen, halogen, —CN, —$CF_3$, —$CF_2H$, —$CFH_2$, —$OCF_3$, —$OCF_2H$, or alkyl, alkoxy, alkoxyalkyl or alkenyl having from 1 to 10 carbon atoms; $R^2$, $R^3$ and $R^5$ are hydrogen; $A^1$ to $A^4$ are independently 1,4-cyclohexylene, 1,4-cyclohexenylene or 1,4-phenylene where any hydrogen may be substituted with halogen; $Z^1$ to $Z^3$ are independently a single bond, —$(CH_2)_2$—, —CH=CH—, —CF=CF—, —$OCF_2$— or —$CF_2O$—; $Z^4$ is a single bond, —$(CH_2)_3$— or —$(CH_2)_4$—; m, n and q are independently 0, 1 or 2. The uppermost temperature of the liquid crystalline phase of the compound is high, and the compound has good compatibility with other compounds and has the necessary characteristics such as optical anisotropy. Also provided are a polymer having many good characteristics of transparency, mechanical strength, coatability, solubility, crystallinity, shrinkage, water permeability, water absorption, melting point, glass transition point, clearing point and chemical resistance; an optically-anisotropic material of the polymer; a liquid-crystal display device that comprises the polymer; and a method for producing the liquid-crystalline compound.

25 Claims, No Drawings

LIQUID-CRYSTALLINE VINYL KETONE DERIVATIVES AND THEIR POLYMERS

BACKGROUND OF THE INVENTION

1. Field of the Invention

The present invention relates to liquid-crystalline compounds having α,β-unsaturated carbonyl (propenoyl) and their polymers, to use of the polymers, and to a method for producing the compounds. The polymers may be usable for optically-anisotropic materials and for liquid-crystal display devices.

2. Description of the Related Art

Polymerizable liquid-crystalline compounds are used these days for optically-anisotropic materials for polarizers, retarders, etc. This is because the compounds are optically anisotropic while they are in liquid-crystalline condition, and their orientation is fixed through polymerization. The necessary optical characteristics of optically-anisotropic materials vary depending on the object of the shaped articles, and compounds of which the characteristics could meet the object are needed. In using them, in general, the compounds are polymerized into their polymers, and the polymers are molded. Of the compounds for that object, the characteristics of the polymers are also important in addition to the above-mentioned anisotropy thereof. The characteristics include the polymerization rate of the compounds, and the transparency, the mechanical strength, the coatability, the solubility, the degree of crystallinity, the degree of shrinkage, the water permeability, the water absorption, the melting point, the glass transition point, the clearing point and the chemical resistance of the polymers.

Acrylates are highly reactive for polymerization and their polymers are highly transparent, and therefore they are used for the object as above (for example, see patent reference 1, patent reference 2 and patent reference 3). However, acrylates could not fully satisfy the characteristics of liquid crystallinity, compatibility with other compounds, and optical anisotropy. In addition, all acrylate polymers are not always good in point of the transparency, the mechanical strength, the coatability, the solubility, the degree of crystallinity, the degree of shrinkage, the water permeability, the water absorption, the melting point, the glass transition point, the clearing point and the chemical resistance thereof. Given that situation, it is an urgent theme in the art to develop compounds, of which the uppermost temperature of the liquid crystalline phase is high or the temperature range of the liquid crystalline phase is broad and which have good compatibility with others, and to develop their polymers that are good in point of the mechanical strength, the coatability, the solubility, the degree of shrinkage, the water permeability, the water absorption, the melting point, the glass transition point, the clearing point and the chemical resistance thereof.

The related art of α,β-unsaturated carbonyl-having liquid-crystalline compounds is, for example, in patent reference 4 and patent reference 5.

Patent Reference 1: JP-A 7-17910/1995

Patent Reference 2: JP-A 8-3111/1996 (U.S. Pat. No. 5,863,457A)

Patent Reference 3: JP-A 9-316032/1997

Patent Reference 4: German Patent Laid-Open No. 19919153 (U.S. Pat. No. 6,440,328B1)

Patent Reference 5: Pamphlet of International Patent Laid-Open No. 97/23580 (U.S. Pat. No. 5,798,057A)

SUMMARY OF THE INVENTION

One object of the invention is to provide a polymerizable liquid-crystalline compound, of which the uppermost temperature of the liquid crystalline phase is high and which has good compatibility with other compounds and has the necessary characteristics such as optical anisotropy, and to provide a liquid-crystal composition containing the compound. Another object is to provide a polymer having many good characteristics of transparency, mechanical strength, coatability, solubility, crystallinity, shrinkage, water permeability, water absorption, melting point, glass transition point, clearing point and chemical resistance, and to provide an optically-anisotropic material of the polymer. Still another object is to provide a liquid-crystal display device that comprises the polymer. Still another object is to provide a method for producing the liquid-crystalline compound.

To attain the objects as above, the invention includes the following:

1. A compound of formula (1):

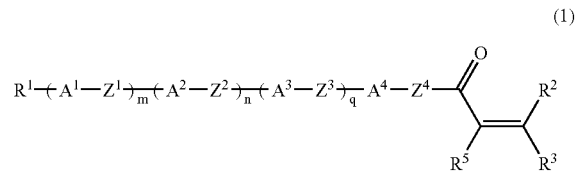

$$R^1-(A^1-Z^1)_m-(A^2-Z^2)_n-(A^3-Z^3)_q-A^4-Z^4-\underset{R^5}{\overset{O}{\underset{\|}{C}}}\overset{R^2}{\underset{R^3}{=}}\quad(1)$$

In formula (1), $R^1$ represents hydrogen, halogen, —CN, —CF$_3$, —CF$_2$H, —CFH$_2$, —OCF$_3$, —OCF$_2$H, —N═C═O, —N═C═S, or alkyl having from 1 to 20 carbon atoms, and any —CH$_2$— of the alkyl may be substituted with —O—, —S—, —CO—, —COO—, —OCO—, —CH═CH—, —CF═CF—, or —C≡C—, and any hydrogen thereof may be substituted with halogen or —CN. Preferably, the neighboring two (—CH$_2$—)s are not substituted into —O—O—, —O—S— or —S—S—.

The meaning of the wording "any —CH$_2$— of the alkyl may be substituted with —O—, —CH═CH— or the like" is described with reference to one example thereof. In case where any —CH$_2$— of C$_4$H$_9$— is substituted with —O— or —CH═CH—, the resulting group includes, for example, C$_3$H$_7$O—, CH$_3$—O—(CH$_2$)$_2$—, CH$_3$—O—CH$_2$—O—, H$_2$C═CH—(CH$_2$)$_3$—, CH$_3$—CH═CH—(CH$_2$)$_2$—, and CH$_3$—CH═CH—CH$_2$—O—. To that effect, the word "any" means "at least any one selected with no limitation thereon". In consideration of the stability of the compound, CH$_3$—O—CH$_2$—O— not having neighboring oxygen atoms is preferred to CH$_3$—O—O—CH$_2$— that has neighboring oxygen atoms.

Preferably, $R^1$ is hydrogen, halogen, —CN, —CF$_3$, —CF$_2$H, —CFH$_2$, —OCF$_3$, —OCF$_2$H, alkyl having from 1 to 10 carbon atoms, alkoxy having from 1 to 10 carbon atoms, alkoxyalkyl having from 2 to 10 carbon atoms, or alkenyl having from 2 to 10 carbon atoms. In these groups, the alkyl and the alkenyl are preferably linear and not branched. Especially preferably, $R^1$ is hydrogen, fluorine, chlorine, —CN, —CF$_3$, —CF$_2$H, —CFH$_2$, —OCF$_3$, —OCF$_2$H, methyl, ethyl, propyl, butyl, pentyl, hexyl, heptyl, octyl, methoxy, ethoxy, propoxy, butoxy, pentyloxy, hexyloxy, heptyloxy, octyloxy, methoxymethyl, ethoxymethyl, propoxymethyl, butoxymethyl, methoxyethyl, ethoxyethyl, propoxyethyl, methoxypropyl, ethoxypropyl, propoxypropyl, 2-fluoroethyl, 3-fluoropropyl, vinyl, 1-propenyl, 2-propenyl, allyl, 3-butenyl or 3-pentenyl.

$R^2$, $R^3$ and $R^5$ each independently represent hydrogen or an alkyl having from 1 to 3 carbon atoms. Preferably, $R^2$, $R^3$ and $R^5$ are hydrogen.

$A^1$, $A^2$, $A^3$ and $A^4$ each independently represent 1,4-cyclohexylene, 1,4-cyclohexenylene, 1,4-phenylene, naphthalene-2,6-diyl, tetrahydronaphthalene-2,6-diyl, fluorene-2,7-diyl, bicyclo[2.2.2]octane-1,4-diyl, or bicyclo[3.1.0]hexane-3,6-diyl. In these rings, any —$CH_2$— may be substituted with —O—, and any —CH= may be substituted with —N=. In these rings, any hydrogen may be substituted with halogen or alkyl having from 1 to 5 carbon atoms. The latter "these rings" include rings in which any —$CH_2$— is substituted with —O—, and rings in which any —CH= is substituted with —N=. In consideration of the stability of the compound, —$CH_2$—O—$CH_2$—O— not having neighboring oxygen atoms is preferred to —$CH_2$—O—O—$CH_2$— that has neighboring oxygen atoms.

Preferably, $A^1$, $A^2$, $A^3$ and $A^4$ are any of 1,4-cyclohexylene, 1,4-phenylene, 2-fluoro-1,4-phenylene, 2,3-difluoro-1,4-phenylene, 2,5-difluoro-1,4-phenylene, 2,6-difluoro-1,4-phenylene, 1,3-dioxane-2,5-diyl, pyridine-2,5-diyl, 6-fluoropyridine-2,5-diyl, pyrimidine-2,5-diyl, pyridazine-3,6-diyl, naphthalene-2,6-diyl, tetrahydronaphthalene-2,6-diyl, and fluorene-2,7-diyl. More preferably, $A^1$, $A^2$, $A^3$ and $A^4$ are any of 1,4-cyclohexylene, 1,4-phenylene, 2-fluoro-1,4-phenylene, 2,3-difluoro-1,4-phenylene, 2,5-difluoro-1,4-phenylene, and 2,6-difluoro-1,4-phenylene. Trans is preferred to cis for the configuration of 1,4-cyclohexylene and 1,3-dioxane-2,5-diyl.

In the compound of high optical anisotropy, $A^1$, $A^2$, $A^3$ or $A^4$ are preferably any of 1,4-phenylene, pyridine-2,5-diyl, pyrimidine-2,5-diyl, pyridazine-3,6-diyl, naphthalene-2,6-diyl, tetrahydronaphthalene-2,6-diyl or fluorene-2,7-diyl optionally substituted with halogen. In the compound of low optical anisotropy, $A^1$, $A^2$, $A^3$ or $A^4$ are preferably any of cyclohexane-1,4-diyl, cyclohexene-1,4-diyl or 1,3-dioxane-2,5-diyl. In these compounds, the second ring counted from $R^1$ is preferably 1,4-phenylene in point of the compatibility of the compounds. Also preferably, the second ring counted from $R^1$ is 1,4-phenylene with at least one hydrogen substituted with fluorine in point of the great dielectric anisotropy of the compounds.

$Z^1$, $Z^2$ and $Z^3$ each independently represent a single bond, —$(CH_2)_a$—, —$O(CH_2)_a$—, —$(CH_2)_aO$—, —$O(CH_2)_aO$—, —CH=CH—, —C≡C—, —COO—, —OCO—, —$(CF_2)_2$—, —C≡C—COO—, —OCO—C≡C—, —CH=CH—$(CH_2)_2$—, —$(CH_2)_2$—CH=CH—, —CF=CF—, —C≡C—HC=CH—, —CH=CH—C≡C—, —$OCF_2$—, or —$CF_2O$—; and a indicates an integer of from 1 to 20.

Preferably, $Z^1$, $Z^2$ and $Z^3$ are any of a single bond, —$(CH_2)_2$—, —$(CH_2)_4$—, —$OCH_2$—, —$O(CH_2)_3$—, —$CH_2O$—, —$(CH_2)_3O$—, —$O(CH_2)_2O$—, —CH=CH—, —C≡C—, —COO—, —OCO—, —$(CF_2)_2$—, —CF=CF—, —$OCF_2$— or —$CF_2O$—. More preferably, $Z^1$, $Z^2$ and $Z^3$ are any of a single bond, —$(CH_2)_2$—, —$OCH_2$—, —$CH_2O$—, $O(CH_2)_2O$—, —CH=CH—, —$(CH_2)_4$—, —CF=CF—, —$OCF_2$— or —$CF_2O$—. In the compound of low viscosity, $Z^1$, $Z^2$ and $Z^3$ are preferably any of a single bond, —$(CH_2)_2$—, —CH=CH—, —CF=CF—, —$OCF_2$— or —$CF_2O$—. In these bonding groups, trans is preferred to cis for the double bond.

$Z^4$ represents a single bond or α,ω-alkylene having from 1 to 4 carbon atoms. Any —$CH_2$— of the alkylene may be substituted with —O—, —S—, —COO— or —OCO—. Preferably, the α,ω-alkylene has from 2 to 4 carbon atoms, more preferably 3 or 4 carbon atoms. Preferred examples of the α,ω-alkylene are the following ($Z^4$-1) to ($Z^4$-7)

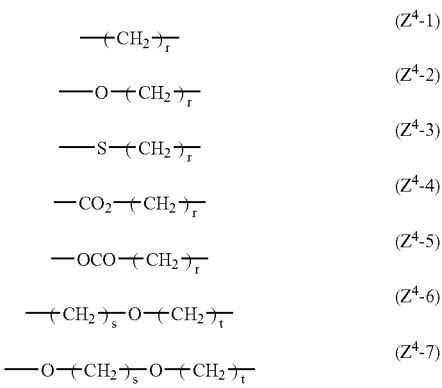

In ($Z^4$-1) to ($Z^4$-7), r indicates an integer of from 1 to 4, and s and t each independently indicate an integer of 1 or 2. In consideration of the easy productivity and the good characteristics thereof, the compounds where $Z^4$ is a single bond are the best.

m, n and q each independently indicate 0, 1 or 2. When the sum of m, n and q is 1, the compounds are bicyclic compounds having two rings such as a 6-membered ring. When the sum of m, n and q is 2 or 3, the compounds are tricyclic or tetracyclic compounds, respectively. When m is 2, two $A^1$'s (or two $Z^1$'s) may be the same or different. The same shall apply to the cases where n is 2 and where q is 2. When the temperature range of the liquid crystalline phase thereof is desired to cover low temperatures, then bicyclic compounds may be selected; but when it is desired to cover relatively high temperatures, then tricyclic or tetracyclic compounds may be selected. When the temperature range of the liquid crystalline phase thereof is desired to cover higher temperatures, then compounds where the sum of m, n and q is 4, 5 or 6 may be selected.

2. The compound of above 1, in which $R^5$ in formula (1) is hydrogen.

3. The compound of above 2, in which $R^2$ and $R^3$ in formula (1) in above 1 are hydrogen.

4. The compound of above 3, in which $A^1$, $A^2$, $A^3$ and $A^4$ in formula (1) in above 1 are independently any of 1,4-cyclohexylene or 1,4-phenylene, and any hydrogen in these rings may be substituted with halogen.

5. The compound of above 3, in which $A^1$, $A^2$, $A^3$ and $A^4$ in formula (1) in above 1 are independently any of 1,4-cyclohexylene or 1,4-phenylene, and any hydrogen in these rings may be substituted with halogen; and $Z^1$, $Z^2$ and $Z^3$ are independently any of a single bond, —$(CH_2)_a$—, —$O(CH_2)_a$—, —$(CH_2)_aO$—, —$O(CH_2)_aO$—, —CH=CH—, —C≡C—, —COO—, —OCO—, —$OCF_2$—, or —$CF_2O$—.

6. The compound of above 5, in which $Z^4$ in formula (1) in above 1 is a single bond.

7. Any one compound of formulae (a) to (d):

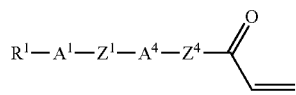

(a)

-continued

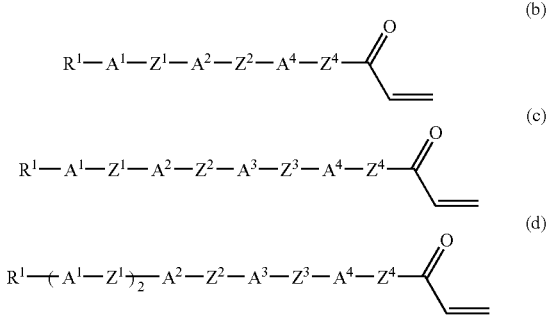

wherein $R^1$ represents hydrogen, halogen, —CN, —$CF_3$, —$CF_2H$, —$CFH_2$, —$OCF_3$, —$OCF_2H$, —N=C=O, —N=C=S, or alkyl having from 1 to 20 carbon atoms, and any —$CH_2$— of the alkyl may be substituted with —O—, —S—, —CO—, —COO—, —OCO—, —CH=CH—, —CF=CF—, or —C≡C—, and any hydrogen thereof may be substituted with halogen or —CN; $A^1$, $A^2$, $A^3$ and $A^4$ each independently represent 1,4-cyclohexylene, 1,4-cyclohexenylene, 1,4-phenylene, naphthalene-2,6-diyl, tetrahydronaphthalene-2,6-diyl, fluorene-2,7-diyl, bicyclo[2.2.2]octane-1,4-diyl, or bicyclo[3.1.0]hexane-3,6-diyl, and in these rings, any —$CH_2$— may be substituted with —O—, and any —CH= may be substituted with —N=, and in these rings, any hydrogen may be substituted with halogen or alkyl having from 1 to 5 carbon atoms; $Z^1$, $Z^2$ and $Z^3$ each independently represent a single bond, —$(CH_2)_a$—, —$O(CH_2)_a$—, —$(CH_2)_aO$—, —$O(CH_2)_aO$—, —CH=CH—, —C≡C—, —COO—, —OCO—, —$(CF_2)_2$—, —C≡C—COO—, —OCO—C≡C—, —CH=CH—$(CH_2)_2$—, —$(CH_2)_2$—CH=CH—, —CF=CF—, —C≡C—HC=CH—, —CH=CH—C≡C—, —$OCF_2$—, or —$CF_2O$—, and a indicates an integer of from 1 to 20; $Z^4$ represents a single bond or α,ω-alkylene having from 1 to 4 carbon atoms, and any —$CH_2$— of the alkylene may be substituted with —O—, —S—, —COO— or —OCO—.

8. The compound of above 7, in which $R^1$ in formulae (a) to (d) is hydrogen, halogen, —CN, —$CF_3$, —$CF_2H$, —$CFH_2$, —$OCF_3$, —$OCF_2H$, alkyl having from 1 to 10 carbon atoms, alkoxy having from 1 to 10 carbon atoms, alkoxyalkyl having from 2 to 10 carbon atoms, or alkenyl having from 2 to 10 carbon atoms; $A^1$, $A^2$, $A^3$ and $A^4$ are independently any of 1,4-cyclohexylene or 1,4-phenylene, and in these rings, any hydrogen may be substituted with halogen; $Z^1$, $Z^2$ and $Z^3$ are independently any of a single bond, —$(CH_2)_2$—, —$(CH_2)_4$—, —$OCH_2$—, —$O(CH_2)_3$—, —$CH_2O$—, —$(CH_2)_3O$—, —$O(CH_2)_2O$—, —CH=CH—, —C≡C—, —COO—, —OCO—, —$(CF_2)_2$—, —CF=CF—, —$OCF_2$— or —$CF_2O$—; $Z^4$ is a single bond.

9. A liquid-crystal composition containing at least two polymerizable compounds, in which at least one polymerizable compound is the compound of any one of above 1 to 8.

10. The liquid-crystal composition of above 9, in which all the polymerizable compounds are the compounds of any one of above 1 to 8.

11. The liquid-crystal composition of above 9, which contains at least one compound of any one of above 1 to 8 and at least one polymerizable compound except the compound.

12. The liquid-crystal composition of any one of above 9 to 11, which additionally contains an optically-active compound.

13. A polymer having a constitutional unit of formula (2):

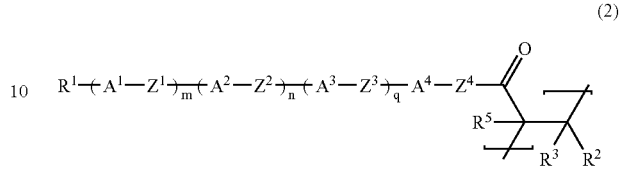

wherein $R^1$ represents hydrogen, halogen, —CN, —$CF_3$, —$CF_2H$, —$CFH_2$, —$OCF_3$, —$OCF_2H$, —N=C=O, —N=C=S, or alkyl having from 1 to 20 carbon atoms, and any —$CH_2$— of the alkyl may be substituted with —O—, —S—, —CO—, —COO—, —OCO—, —CH=CH—, —CF=CF—, or —C≡C—, and any hydrogen thereof may be substituted with halogen or —CN; $R^2$, $R^3$ and $R^5$ each independently represent hydrogen or an alkyl having from 1 to 3 carbon atoms; $A^1$, $A^2$, $A^3$ and $A^4$ each independently represent 1,4-cyclohexylene, 1,4-cyclohexenylene, 1,4-phenylene, naphthalene-2,6-diyl, tetrahydronaphthalene-2,6-diyl, fluorene-2,7-diyl, bicyclo[2.2.2]octane-1,4-diyl, or bicyclo[3.1.0]hexane-3,6-diyl, and in these rings, any —$CH_2$— may be substituted with —O—, and any —CH= may be substituted with —N=, and in these rings, any hydrogen may be substituted with halogen or alkyl having from 1 to 5 carbon atoms; $Z^1$, $Z^2$ and $Z^3$ each independently represent a single bond, —$(CH_2)_a$—, —$O(CH_2)_a$—, —$(CH_2)_aO$—, —$O(CH_2)_aO$—, —CH=CH—, —C≡C—, —COO—, —OCO—, —$(CF_2)_2$—, —C≡C—COO—, —OCO—C≡C—, —CH=CH—$(CH_2)_2$—, —$(CH_2)_2$—CH=CH—, —CF=CF—, —C≡C—HC=CH—, —CH=CH—C≡C—, —$OCF_2$—, or —$CF_2O$—, and a indicates an integer of from 1 to 20; $Z^4$ represents a single bond or α,ω-alkylene having from 1 to 4 carbon atoms, and any —$CH_2$— of the alkylene may be substituted with —O—, —S—, —COO— or —OCO—; and m, n and q each independently indicate 0, 1 or 2.

14. The polymer of above 13, in which $R^5$ in formula (2) is hydrogen.

15. The polymer of above 14, in which $R^2$ and $R^3$ in formula (2) in above 13 are hydrogen.

16. The polymer of above 15, in which $A^1$, $A^2$, $A^3$ and $A^4$ in formula (2) in above 13 are independently any of 1,4-cyclohexylene or 1,4-phenylene, and any hydrogen in these rings may be substituted with halogen.

17. The polymer of above 15, in which $A^1$, $A^2$, $A^3$ and $A^4$ in formula (2) in above 13 are independently any of 1,4-cyclohexylene or 1, 4-phenylene, and any hydrogen in these rings may be substituted with halogen; and $Z^1$, $Z^2$ and $Z^3$ are independently any of a single bond, —$(CH_2)_a$—, —$O(CH_2)_a$—, —$(CH_2)_aO$—, —$O(CH_2)_aO$—, —CH=CH—, —C≡C—, —COO—, —OCO—, —$OCF_2$—, or —$CF_2O$—.

18. The polymer of above 17, in which $Z^4$ in formula (2) in above 13 is a single bond.

19. The polymer of above 13, in which $R^1$ in formula (2) is hydrogen, halogen, —CN, —$CF_3$, —$CF_2H$, —$CFH_2$, —$OCF_3$, —$OCF_2H$, alkyl having from 1 to 10 carbon atoms, alkoxy having from 1 to 10 carbon atoms, alkoxyalkyl having from 2 to 10 carbon atoms, or alkenyl having from 2 to 10 carbon atoms; $R^2$, $R^3$ and $R^5$ are hydrogen; $A^1$, $A^2$, $A^3$ and $A^4$ are independently any of 1,4-cyclohexylene or 1,4-phenylene, and in these rings, any hydrogen may be substituted with halogen; $Z^1$, $Z^2$ and $Z^3$ are independently any of a single bond, —(CH$_2$)$_2$—, —(CH$_2$)$_4$—, —OCH$_2$—, —O(CH$_2$)$_3$—, —CH$_2$O—, —(CH$_2$)$_3$O—, —O(CH$_2$)$_2$O—, —CH=CH—, —C≡C—, —COO—, —OCO—, —(CF$_2$)$_2$—, —CF=CF—, —OCF$_2$— or —CF$_2$O—; $Z^4$ is a single bond.

20. The polymer of above 13, which is obtained through homopolymerization of one compound of any one of above 1 to 8.

21. The polymer of above 13, which is obtained from the liquid-crystal composition of any one of above 9 to 12.

22. An optically-anisotropic material of the polymer of any one of above 13 to 21.

23. A liquid-crystal display device, which contains the polymer of any one of above 13 to 21.

24. A liquid-crystal display device, which contains the optically-anisotropic material of above 22.

25. A method for producing a vinyl ketone compound of formula (1b), which comprises reacting one molar equivalent of a compound of formula (1a) with from 1 to 10 molar equivalents of a Lewis acid at −70° C. to 200° C., followed by dehydrohalogenating the resulting compound:

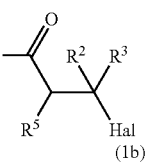

(1a)

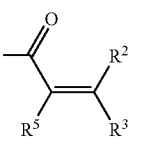

(1b)

wherein $R^4$ represents hydrogen, halogen, —OH, —CN, —CF$_3$, —CF$_2$H, —CFH$_2$, —OCF$_3$, —OCF$_2$H, —N=C=O, —N=C=S, or alkyl having from 1 to 20 carbon atoms, and any —CH$_2$— of the alkyl may be substituted with —O—, —S—, —CO—, —COO—, —OCO—, —CH=CH—, —CF=CF—, or —C≡C—, and any hydrogen thereof may be substituted with halogen or —CN; $R^2$, $R^3$ and $R^5$ each independently represent hydrogen or an alkyl having from 1 to 3 carbon atoms; $A^1$, $A^2$, $A^3$ and $A^4$ each independently represent 1,4-cyclohexylene, 1,4-cyclohexenylene, 1,4-phenylene, naphthalene-2,6-diyl, tetrahydronaphthalene-2,6-diyl, fluorene-2,7-diyl, bicyclo[2.2.2]octane-1,4-diyl, or bicyclo[3.1.0]hexane-3,6-diyl, and in these rings, any —CH$_2$— may be substituted with —O—, and any —CH= may be substituted with —N=, and in these rings, any hydrogen may be substituted with halogen or alkyl having from 1 to 5 carbon atoms; $Z^1$, $Z^2$ and $Z^3$ each independently represent a single bond, —(CH$_2$)$_a$—, —O(CH$_2$)$_a$—, —(CH$_2$)$_a$O—, —O(CH$_2$)$_a$O—, —CH=CH—, —C≡C—, —COO—, —OCO—, —(CF$_2$)$_2$—, —C≡C—COO—, —OCO—C≡C—, —CH=CH—(CH$_2$)$_2$—, —(CH$_2$)$_2$—CH=CH—, —CF=CF—, —C≡C—HC=CH—, —CH=CH—C≡C—, —OCF$_2$—, or —CF$_2$O—, and a indicates an integer of from 1 to 20; $Z^4$ represents a single bond or α,ω-alkylene having from 1 to 4 carbon atoms, and any —CH$_2$— of the alkylene may be substituted with —O—, —S—, —COO— or —OCO—; m, n and q each independently indicate 0, 1 or 2; Hal represents chlorine, bromine or iodine.

DETAILED DESCRIPTION OF THE INVENTION

The terms used herein are described. The term "liquid-crystalline compound" is used as a generic term for compounds that have a liquid-crystalline phase and compounds that do not have a liquid-crystalline phase but are useful as a component of liquid-crystal compositions. The term "polymerizable" is meant to indicate the ability to polymerize to give a polymer in any manner known in the art, for example, when exposed to the action of light, heat, catalyst or the like. The terms "liquid-crystalline compound" and "liquid-crystal composition" may be simply referred to as "compound" and "composition", respectively. Compounds of formula (1) may be referred to as compounds (1). Polymers from compounds (1) may be referred to as polymers (2). Acrylate and methacrylate may be referred to as (meth)acrylate.

Compounds (1) and polymers (2) are characterized by the following:

(1) Compounds (1) are bicyclic to heptacyclic and have α,β-unsaturated carbonyl as the polymerizable moiety thereof.

(2) Compounds (1) are significantly chemically stable in their production and handling before polymerization. Therefore, not polymerizing into the intended polymers, they are compatible with any other compounds.

(3) Suitably selecting the terminal group, the ring or the bonding group that constitutes compounds (1) makes it possible to control the physical data of high dielectric anisotropy, low dielectric anisotropy, high optical anisotropy, low optical anisotropy, low viscosity and others of the compounds.

(4) Suitably selecting the structure of compounds (1) makes is possible to produce polymers (2) having many good characteristics of transparency, mechanical strength, coatability, solubility, degree of crystallinity, shrinkage, water permeability, water absorption, melting point, glass transition point, clearing point and chemical resistance. These characteristics may be determined according to the methods defined in JIS.

The physical properties of compounds (1) are described.

Bicyclic and tricyclic compounds (1) have low viscosity. Tricyclic and higher oligocyclic compounds (1) have a high clearing point (liquid crystalline phase-isotropic liquid crystalline phase transition temperature). Even though tricyclic or higher oligocyclic, compounds (1) have good wettability when dissolved in solvent. Therefore, they are advantageous in preparing compositions, applying them onto substrates, and preparing thinner films. Tricyclic and higher oligocyclic compounds (1) may have a liquid crystalline phase in an extremely broad temperature range. These compounds (1) have a higher clearing point. Therefore, when they are mixed with bicyclic compounds (1), then the resulting liquid-crystal compositions may have a high clearing point and the lowermost temperature of the liquid crystalline phase of the compositions may be low.

Compounds (1) having at least two cyclohexane rings have a high clearing point, low optical anisotropy and low viscosity. Compounds (1) having at least one benzene ring have relatively high optical anisotropy and a large orientational order parameter. Compounds (1) having at least two benzene rings have especially high optical anisotropy, and have a broad temperature range for the liquid-crystalline phase thereof.

Compounds (1) in which $R^1$ bonding to 1,4-phenylene is fluorine —CN, —CF$_3$, —OCF$_3$ or —OCF$_2$H, and fluorine is in one or both ortho positions of $R^1$ have especially high dielectric anisotropy. Compounds (1) in which $R^1$ is alkyl or alkoxy, at least one of $A^1$, $A^2$, $A^3$ and $A^4$ is 2,3-difluoro-1,4-phenylene have negative dielectric anisotropy.

When polymerized, compounds (1) in which $R^1$ has α,β-unsaturated carbonyl may give main chain-type polymers (crosslinked). Main chain-type polymers are more advantageous in point of the mechanical strength thereof.

Compounds (1) in which $Z^1$, $Z^2$, $Z^3$ and $Z^4$ are all single bonds have an especially high clearing point. Compounds (1) in which the bonding group has a double bond have a broad temperature range for the liquid crystalline phase thereof. Compounds (1) in which the bonding group has a triple bond have especially high optical anisotropy.

The above indicates that suitably selecting the terminal group, the ring or the bonding group enables one to obtain compounds (1) having the intended characteristics. Even though containing isotopes such as $^2$H (deuterium) and $^{13}$C in a ratio thereof larger than the naturally-existing ratio of these, compounds (1) still have the same characteristics and are favorably used.

Preferred examples of compounds (1) are compounds (1-1) to (1-59). In these compounds, $R^1$, $R^2$, $R^3$, $R^5$, $Z^1$, $Z^2$, $Z^3$ and $Z^4$ have the same meanings as in formula (1). In compounds (1-1) to (1-59), 1,4-cyclohexylene, 1,4-phenylene, 1,4-cyclohexenylene, pyridine-2,5-diyl, naphthalene-2,6-diyl, tetrahydronaphthalene-2,6-diyl and fluorene-2,7-diyl may be substituted with fluorine or methyl as in the formulae mentioned below.

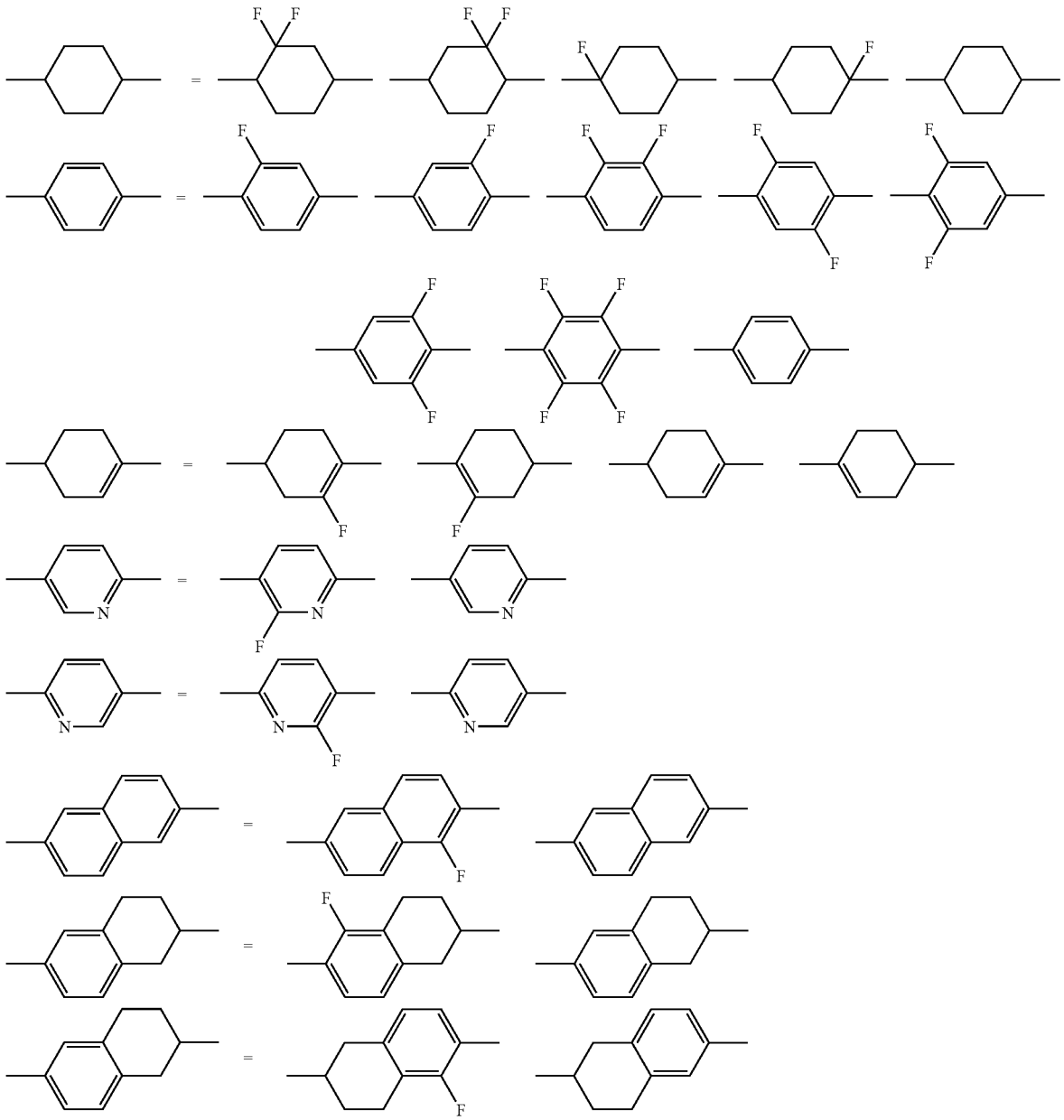

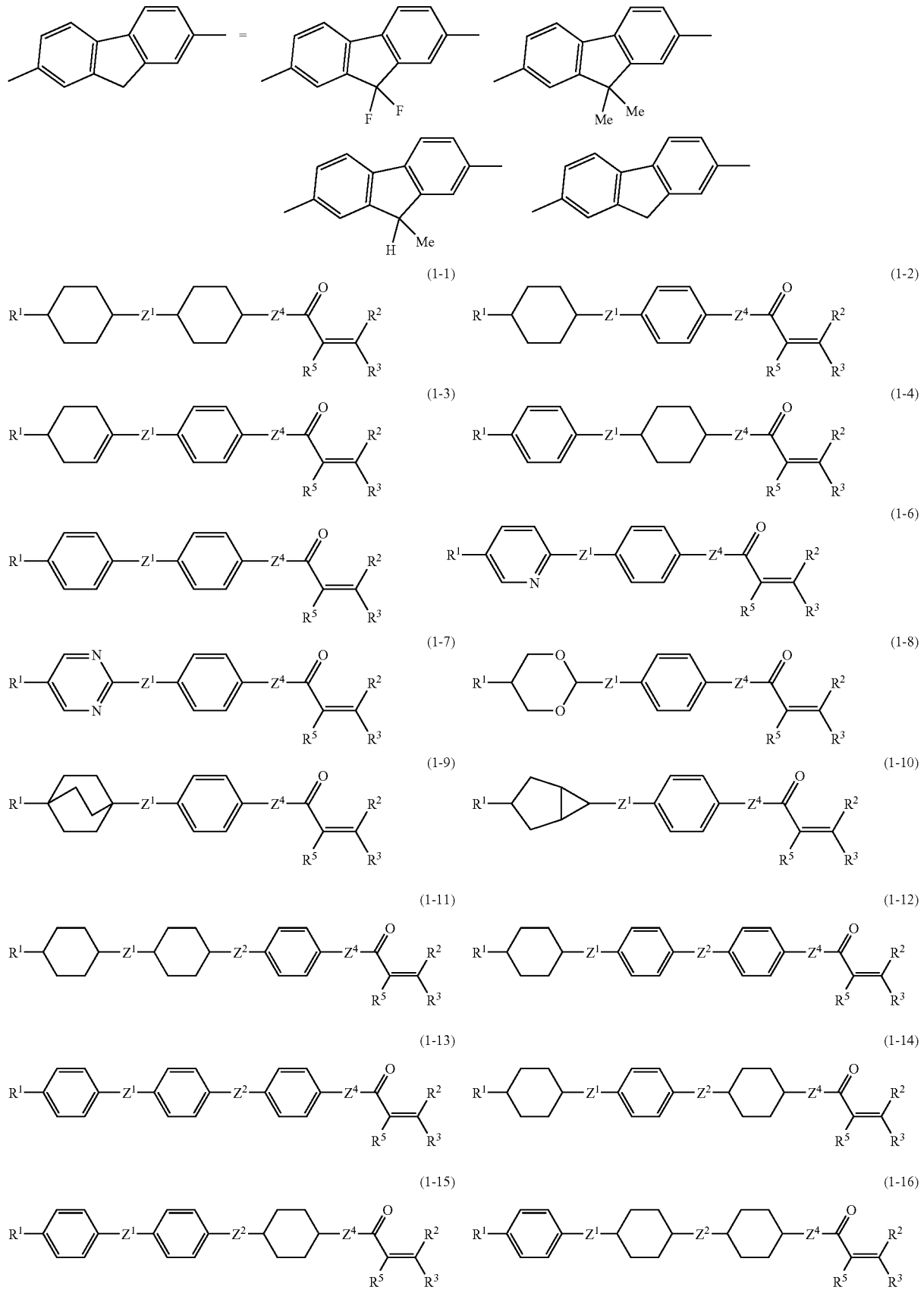

-continued
(1-17)
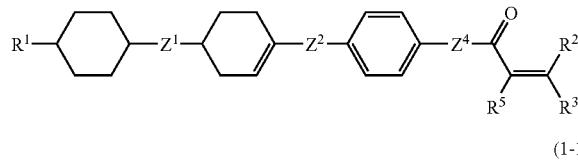
(1-18)
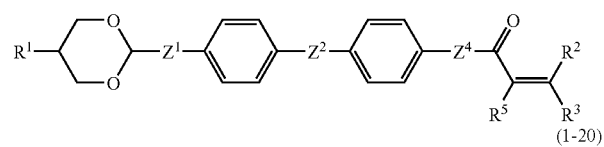
(1-19)
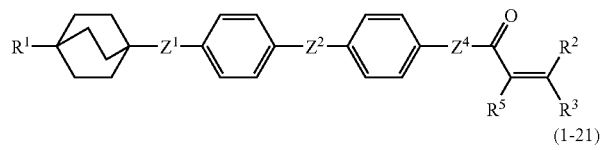
(1-20)
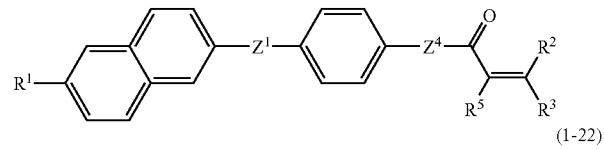
(1-21)
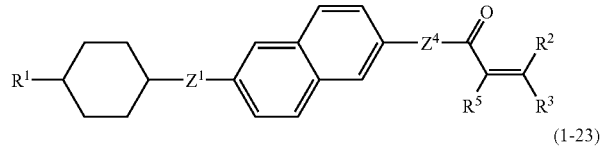
(1-22)
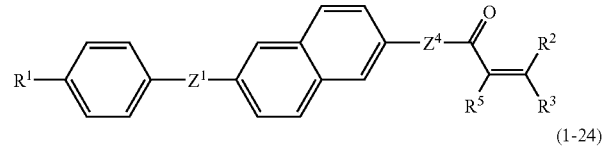
(1-23)
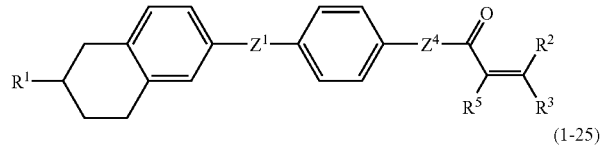
(1-24)
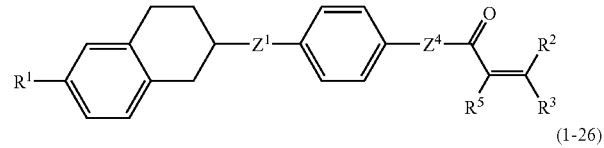
(1-25)
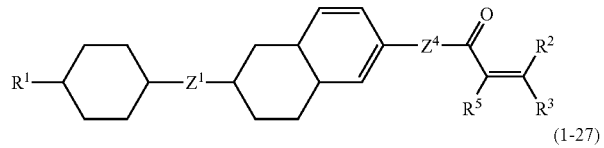
(1-26)
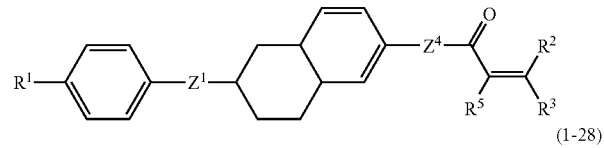
(1-27)
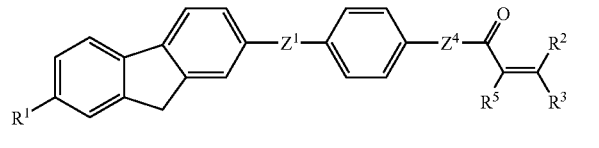
(1-28)
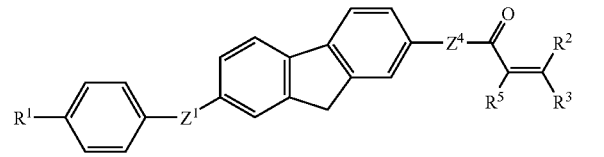
(1-29)
(1-30)
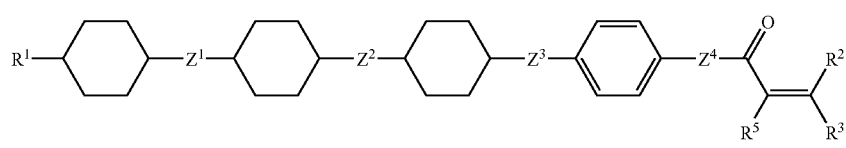
(1-31)
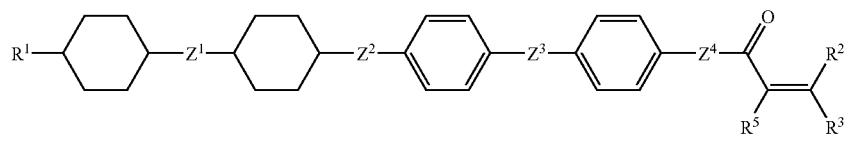
(1-32)
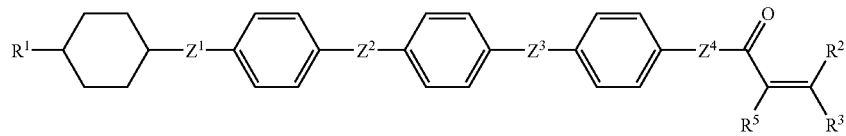

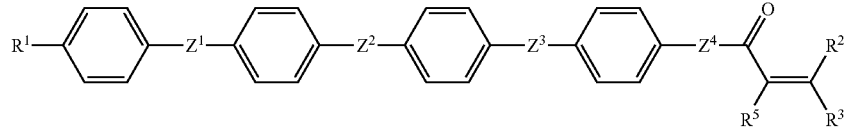
(1-33)
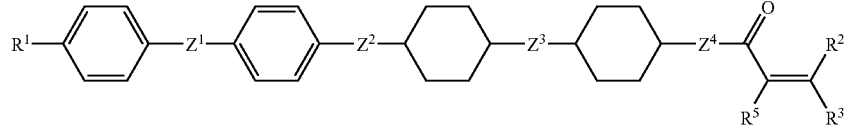
(1-34)
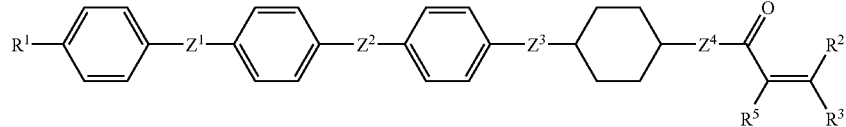
(1-35)
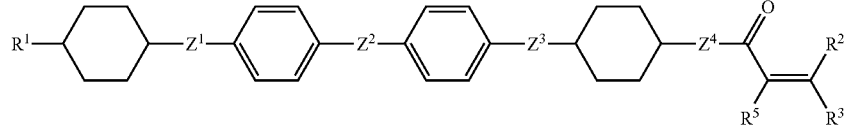
(1-36)
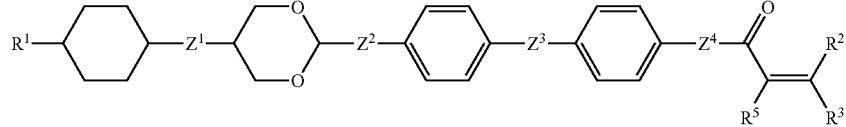
(1-37)
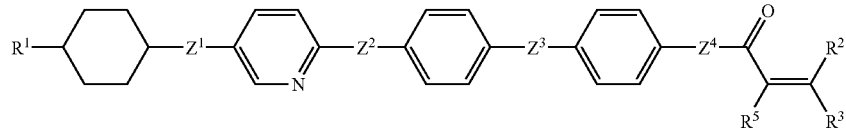
(1-38)
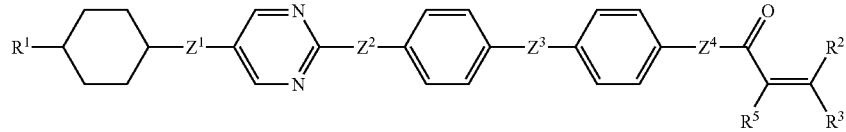
(1-39)
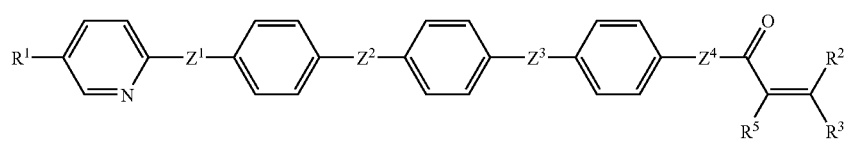
(1-40)
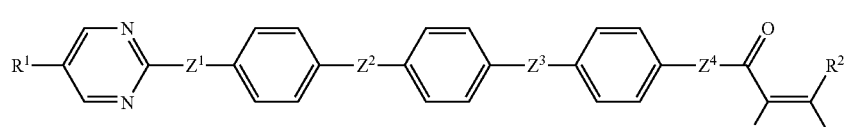
(1-41)
(1-42)
(1-43)
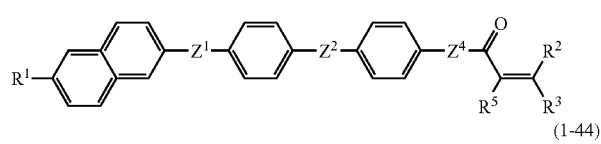
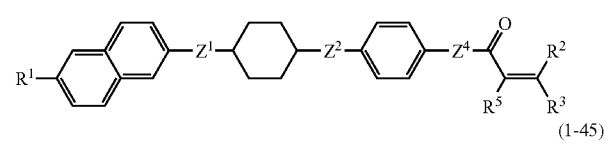
(1-44)
(1-45)
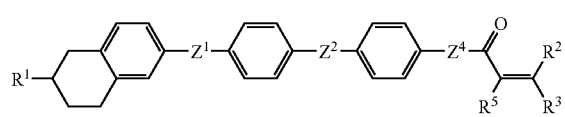
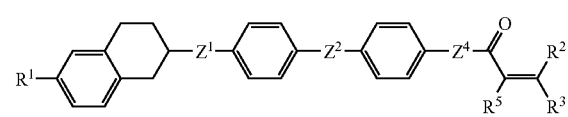

-continued
(1-46)
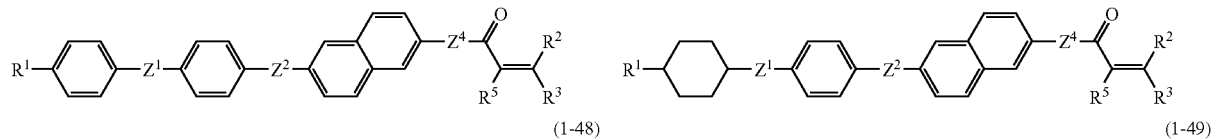
(1-47)
(1-48)
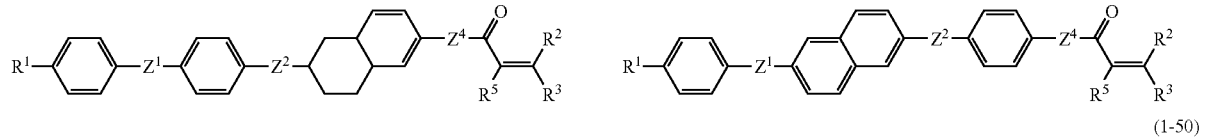
(1-49)
(1-50)
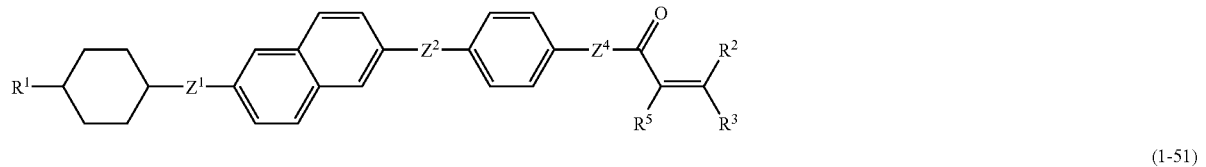
(1-51)
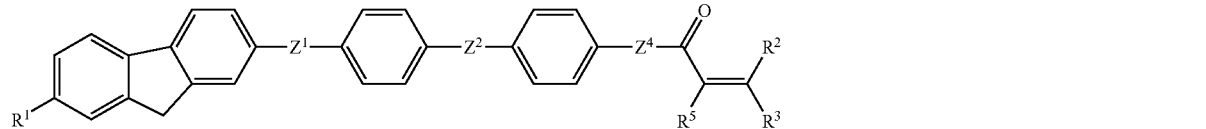
(1-52)
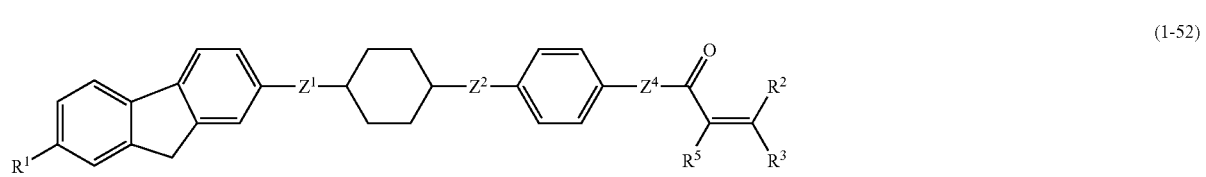
(1-53)
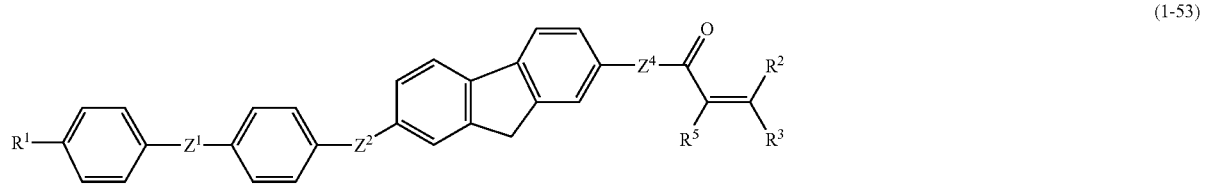
(1-54)
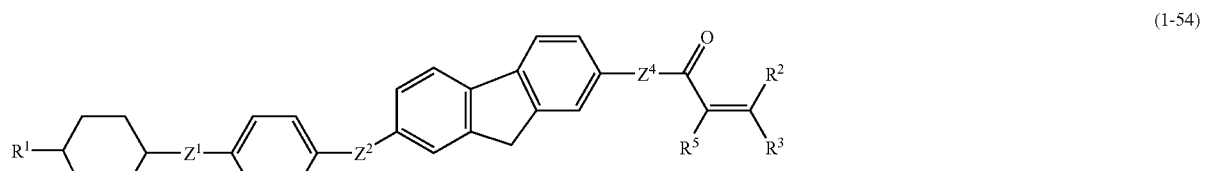
(1-55)
(1-56)
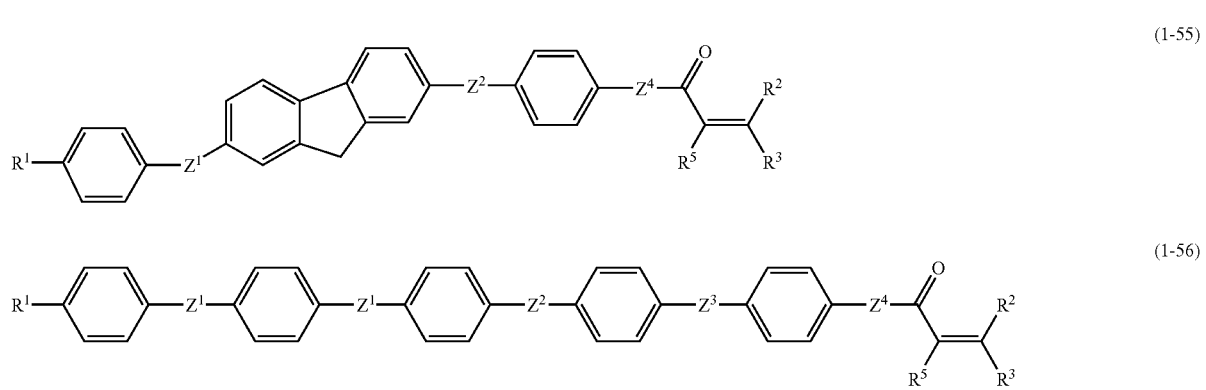

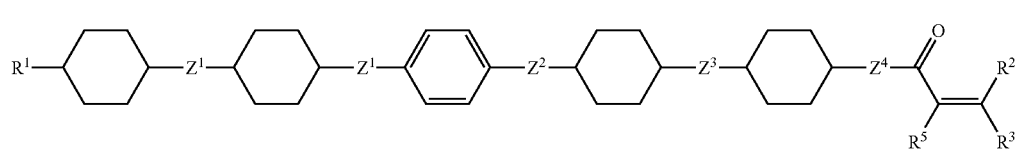

(1-57)

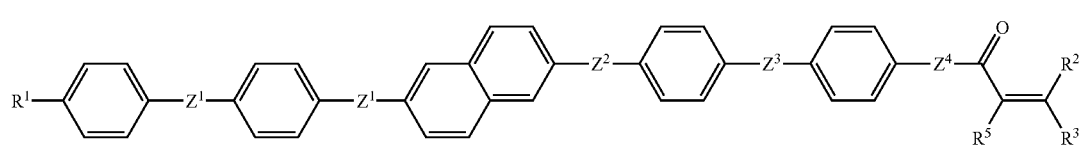

(1-58)

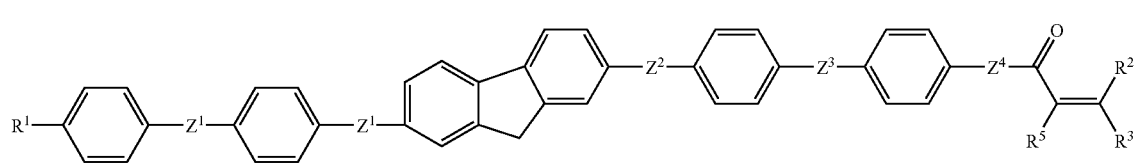

(1-59)

More preferred examples of compounds (1) are compounds (1-1) to (1-5), compounds (1-11) to (1-16), compounds (1-20) to (1-29), compound (1-33), compound (1-49), compound (1-50), compound (1-55) and compound (1-59).

Next described is a method for producing compounds (1).

Compounds (1) may be produced by suitably combining methods for synthesis in the field of organic chemistry such as those described in Houben Wyle, Methoden der Organischen Chemie, Georg Thieme Verlag, Stuttgart; Organic Reactions, John Wily & Sons Inc.; Organic Syntheses, John Wily & Sons, Inc.; Comprehensive Organic Synthesis, Pergamon Press; Lecture of New Experimental Chemistry, Maruzen, etc.

α,β-unsaturated carbonyl may be produced according to the following method. A Grignard reagent (3) is reacted with a β-chloroacid chloride to give a compound (4). Next, this is dehydrochlorinated under a basic condition to give a compound (1). For example, the reaction may be favorably effected by the use of t-BuOK in a polar solvent such as DMSO (reference; Org. Synth. 2000, 78, 142-151). The reaction of the Grignard reagent (3) with a β-chloropropionic acid chloride derivative is favorably effected according to the method described in Tetrahedron Lett., 1987, 28(18), 2053. When $Z^4$ is a single bond and $A^4$ is a benzene ring, a naphthalene ring, tetrahydronaphthalene ring or a fluorene ring, then the compound (4) may be synthesized through simple Friedel-Crafts reaction with anhydrous aluminium chloride or the like. When $Z^4$ is a single bond and $A^4$ is a benzene ring, a naphthalene ring, a tetrahydronaphthalene ring or a fluorene ring, then good dehydrochlorination of the compound (4) is impossible under the above-mentioned basic condition. The reaction is accompanied by product decomposition, side reaction and polymerization, therefore giving an extremely complicated mixture. However, this problem is solved by the use of a Lewis acid. Specifically, one molar equivalent of the compound (4) or the above-mentioned compound (1a) is reacted with from 1 to 10 molar equivalents, preferably from 1 to 5 molar equivalents of a Lewis acid at −70° C. to 200° C., and the resulting compound is dehydrohalogenated to give the compound (1). Preferably, the Lewis acid is anhydrous aluminium chloride.

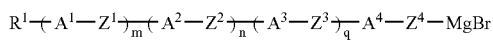

(3)

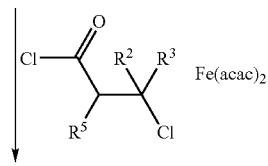

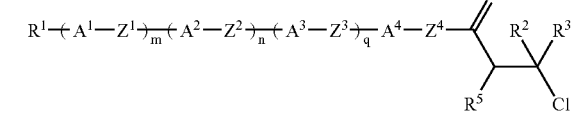

(4)

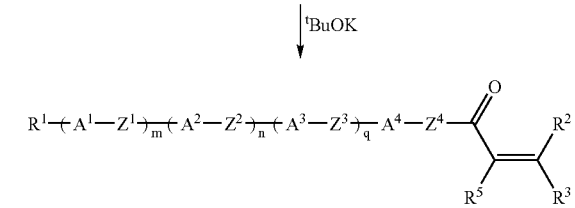

(1)

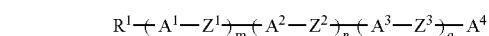

(3')

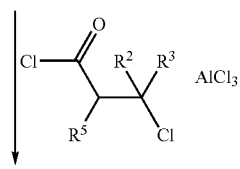

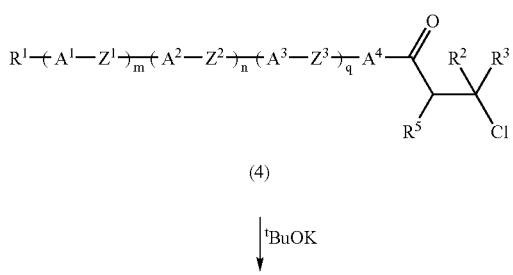

(4)

↓ tBuOK

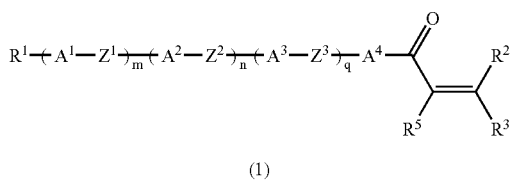

(1)

Some examples of the method of forming the bonding groups $Z^1$, $Z^2$, $Z^3$ and $Z^4$ are described. First shown are the reaction schemes of the method, and the method is described with reference to the schemes. In these schemes, $MSG^1$ and $MSG^2$ each are a monovalent organic group having at least one ring. In these, multiple $MSG^1$'s as well as $MSG^2$'s may be the same or different. Compounds (1A) to (1K) correspond to compounds (1).

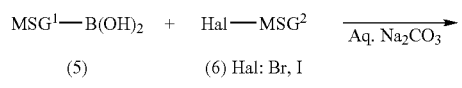
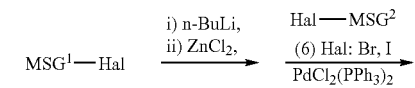
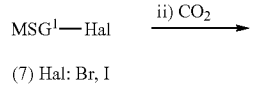
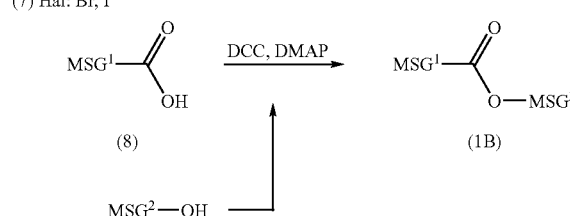
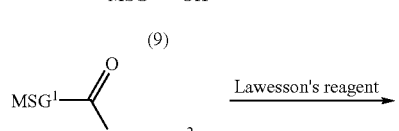
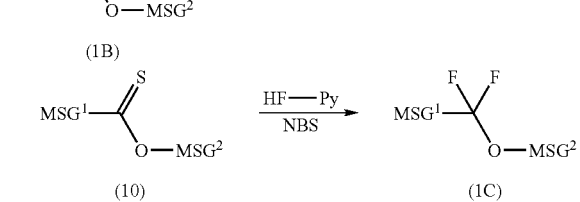

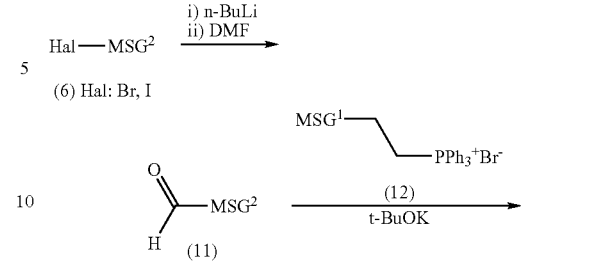
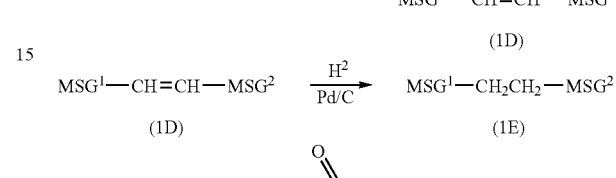
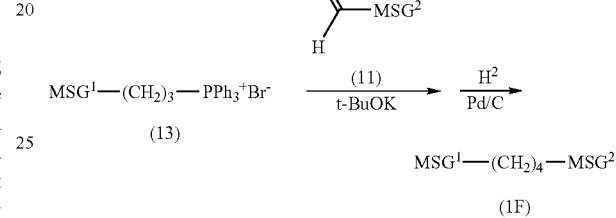
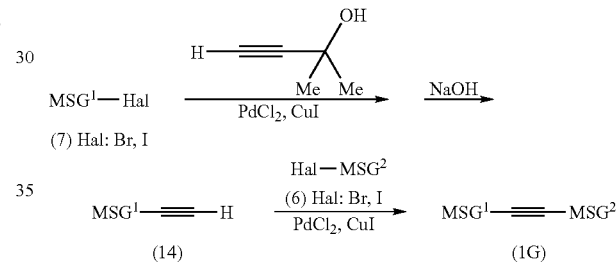
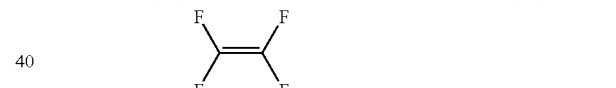
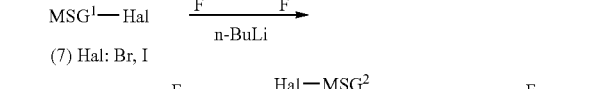
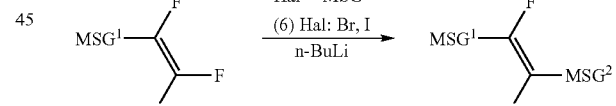
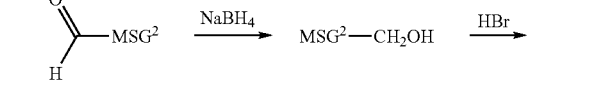
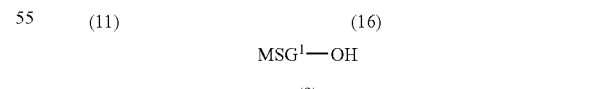
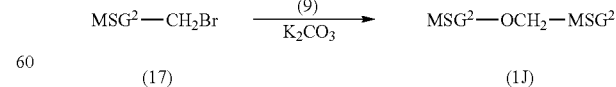

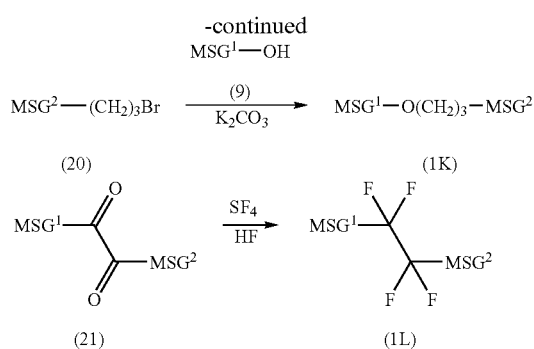

(I) Formation of Single Bond:

A boric acid derivative (5) is reacted with a halide (6) produced in a known method, in an aqueous carbonate solution in the presence of a catalyst such as tetrakis (triphenylphosphine)palladium to give a compound (1A). The compound (1A) may also be produced by reacting a compound (7) produced in a known method with n-butyllithium and then with zinc chloride, followed by further reacting it with a compound (6) in the presence of a catalyst such as dichlorobis(triphenylphosphine)palladium. The boric acid derivative (5) may be produced by converting the compound (7) into a Grignard reagent or a lithium reagent followed by reacting it with a trialkyl borate.

(II) Formation of —COO— and —OCO—:

A compound (7) is reacted with n-butyllithium and then with carbon dioxide to give a carboxylic acid (8). The carboxylic acid (8) is dehydrated with a phenol (10) produced in a known method, in the presence of DDC (1,3-dicyclohexylcarbodiimide) and DMAP (4-dimethylaminopyridine) to give a compound (1B) having —COO—. According to the method, a compound having —OCO— may also be produced.

(III) Formation of —CF$_2$O— and —OCF$_2$—:

The compound (1B) is processed with a sulfurizing agent such as Lawesson reagent to give a compound (10). The compound (10) is fluorinated with hydrogen fluoride-pyridine complex and NBS (N-bromosuccinimide) to give a compound (1C) having —CF$_2$O—. For this, referred to is M. Kuroboshi et al., Chem. Lett., 1992, 827. The compound (1C) may also be produced by fluorinating the compound (10) with (diethylamino) sulfur trifluoride. For this, referred to is William H. Bunnelle et al., J. Org. Chem. 1990, 55, 768. According to the method, a compound having —OCF$_2$— may also be produced.

(IV) Formation of —CH=CH—:

The compound (6) is processed with n-butyllithium and then reacted with a formamide such as N,N-dimethylformamide to give an aldehyde (11). A phosphonium salt (12) produced in a known method is processed with a base such as potassium t-butoxide, and the resulting phosphorylide is reacted with the aldehyde (11) to give a compound (1D). Depending on the reaction condition, the compound formed may be a cis-form. If desired, the cis-form may be isomerized into the corresponding trans-form in a known method.

(V) Formation of —(CH$_2$)$_2$—:

The compound (1D) is hydrogenated in the presence of a catalyst such as palladium-carbon to give a compound (1E).

(VI) Formation of —(CH$_2$)$_4$—L

Using a phosphonium salt (13) in place of the phosphonium salt (12), a compound having —(CH$_2$)$_2$—CH=CH— is produced according to the method of above (IV). This is catalytically hydrogenated to give a compound (1F).

(VII) Formation of —C≡C—:

The compound (7) is reacted with 2-methyl-3-butyn-2-ol in the presence of a catalyst that comprises dichloropalladium and copper halide, and then this is deprotected under a basic condition to give a compound (14). The compound (14) is reacted with the compound (6) in the presence of the catalyst that comprises dichloropalladium and copper halide to give a compound (1G).

(VIII) Formation of —CF=CF—:

The compound (7) is processed with n-butyllithium and then reacted with tetrafluoroethylene to give a compound (15). The compound (15) is processed with n-butyllithium and the reacted with the compound (6) to give a compound (1H).

(IX) Formation of —CH$_2$O— or —OCH$_2$—:

The compound (11) is reduced with a reducing agent such as sodium borohydride to give a compound (16). This is halogenated with hydrobromic acid or the like to give a compound (17). The compound (17) is reacted with the compound (9) in the presence of potassium carbonate or the like to give a compound (1J).

(X) Formation of —(CH$_2$)$_3$O— or —O(CH$_2$)$_3$—:

A compound (18) is used in place of the compound (11) to produce a compound (1K) according to the method of above (IX).

(XI) Formation of —(CF$_2$)$_2$—:

According to the method described in J. Am. Chem. Soc., 2001, 123, 5414, a diketone (21) is fluorinated with sulfur tetrafluoride in the presence of a catalyst of hydrogen fluoride to give a compound (1L) having —(CF$_2$)$_2$—.

Next described is the liquid-crystal composition of the invention.

The composition contains at least one compound (1). The composition may contain at least two compounds (1) for its component. The composition may contain the compound (1) along with any other component. Only one compound (1) may form the liquid-crystal composition by itself. Examples of the other component are liquid-crystalline compounds described in the liquid-crystalline compound data base, LiqCryst® that is sold by Fujitsu Kyushu Engineering; and polymerizable compounds described in JP-A 8-3111. Preferably, the amount of the other component to be in the composition is controlled to such a degree that the additional component in the composition does not detract from the liquid crystallinity of the composition. Even though the component of the composition contains isotopes of the atoms that constitute the component in a ratio thereof larger than the naturally-existing ratio of these, the composition may still have the same characteristics and therefore this is favorable. When the composition is polymerized, a solvent, a polymerization initiator, a catalyst and others may be added thereto, if desired. The composition may be produced from the constitutive components thereof in known methods. For example, the compounds to be the constitutive components are mixed and dissolved optionally under heat.

As the other component thereof, the liquid-crystal composition may contain an additive such as an optically-active compound and a dichroic dye. Having a helical structure, the composition with an optically-active compound added thereto may be polymerized to give a retardation film that have the helical structure. In case where the helical pitch of the structure is from about ½ of the wavelength of light to approximately the wavelength of light, then the retardation film may selectively reflect the light having the wavelength according to the Bragg's law. This is usable, for example, as a functional device for selective reflection of circular polarization. The optically-active compound may be polymerizable or non-polymerizable provided that it may induce a helical structure. The helical direction depends on the configuration of the optically-active compound. Suitably selecting the configuration of the optically-active compound makes it possible to induce the intended helical direction. Preferred examples of the non-polymerizable optically-active compound are compounds (OP-1) to (OP-12). Preferred examples of the polymerizable optically-active compound are compounds (OP-13) to (OP-20).

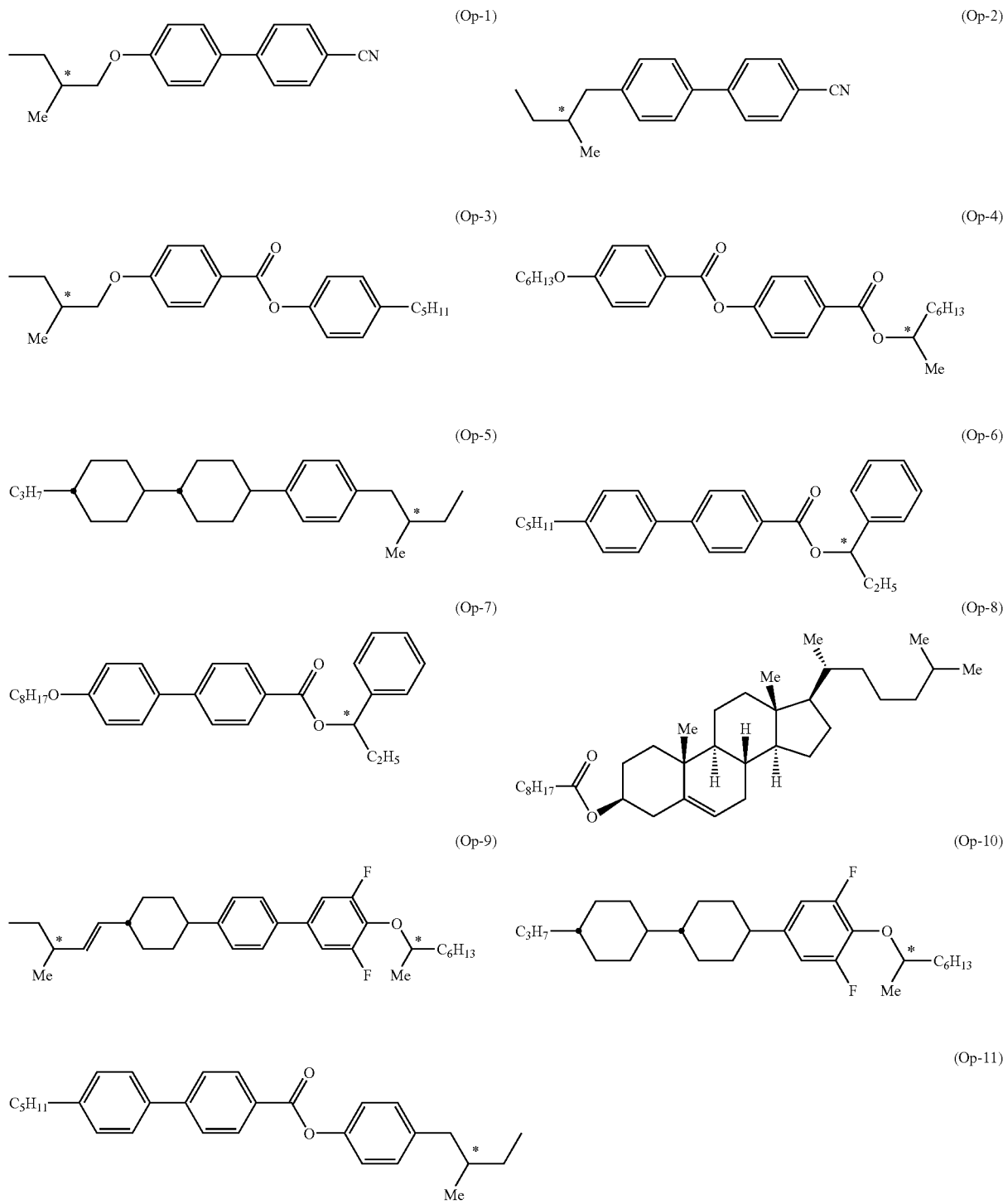

-continued
(Op-12)
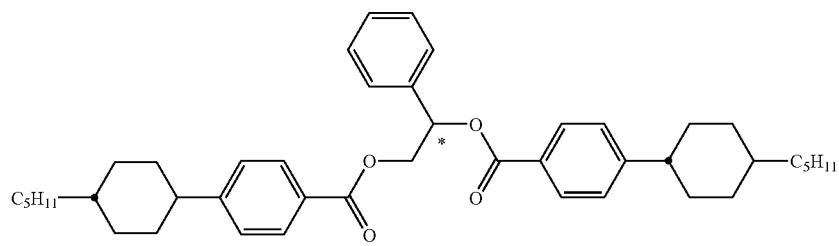
(Op-13)
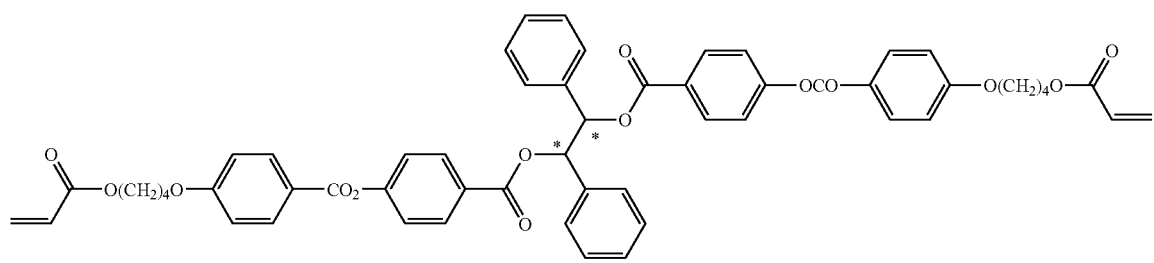
(Op-14)
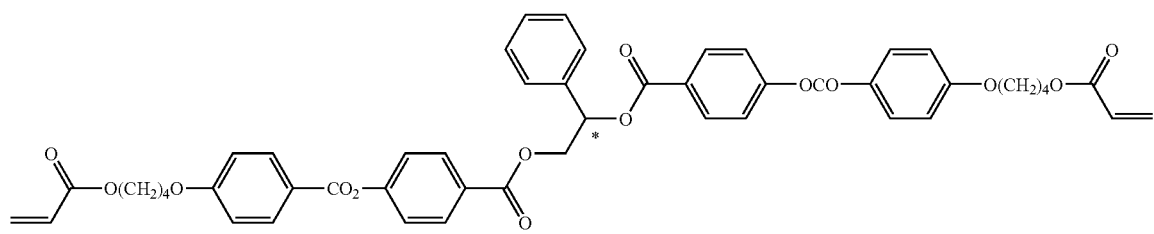
(Op-15)
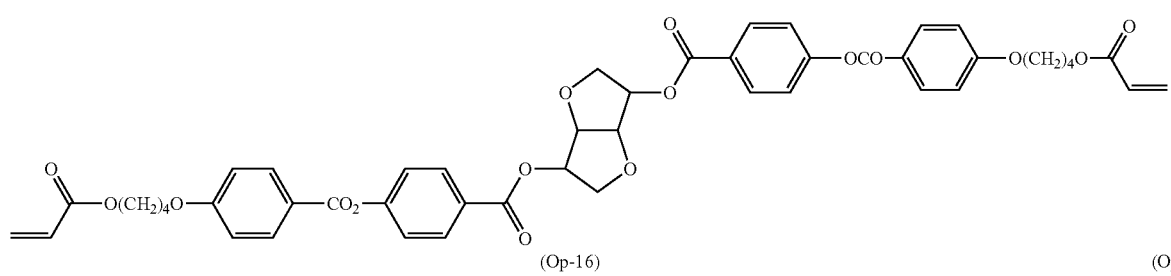
(Op-16) (Op-17)
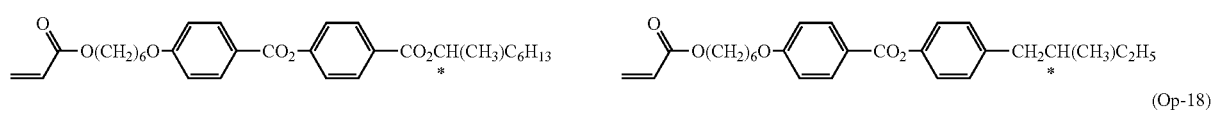
(Op-18)
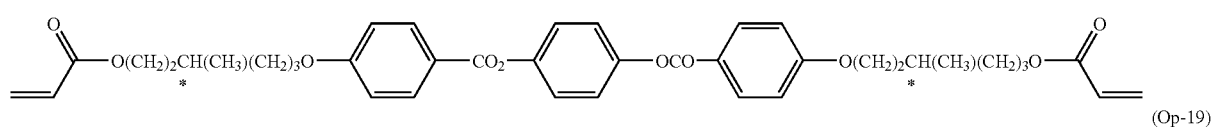
(Op-19)
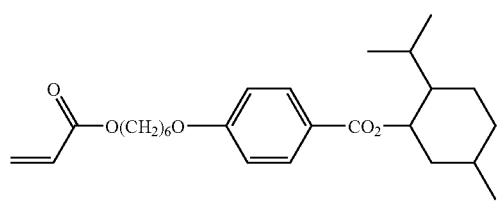

(Op-20)

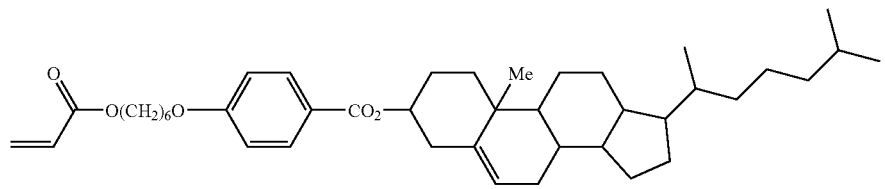

Next described is the polymer of the invention.

Compound (1) has a polymerizable α,β-unsaturated carbonyl. Compound (1) may be polymerized into polymer (2). Polymer (2) may be obtained though radical polymerization, anionic polymerization, cationic polymerization, coordination polymerization, living polymerization or the like. Homopolymerization of one compound (1) gives a homopolymer. The homopolymer comprises constitutional units of one and the same type. When a composition that contains at least two compounds (1) is polymerized, then it gives a copolymer. The copolymer comprises constitutional units of at least two different types. Regarding their arrangement in the copolymer, the constitutional units may be in any form of random, block or alternating copolymer.

The polymerizability of the α,β-unsaturated carbonyl in compound (1) is governed by $R^2$, $R^3$ and $R^5$ therein. When $R^2$, $R^3$ and $R^5$ are hydrogen, compound (1) is polymerizable to the highest degree, and it can be polymerized through exposure to light having the most suitable wavelength.

A composition that contains at least one compound (1) and at least one other polymerizable compound than compound (1) may be copolymerized. The other polymerizable compound than compound (1) may be any one of polymerizability. Not detracting from the film formability and the mechanical strength of the polymer produced, the polymerizable compound may be or may not be liquid-crystalline. Preferred examples of the polymerizable compound are (meth)acrylate compounds, vinyl compounds, styrene compounds, and vinyl ether compounds.

Preferred examples of the non-liquid-crystalline polymerizable compound are methyl (meth)acrylate, ethyl (meth)acrylate, butyl (meth)acrylate, 2-ethylhexyl (meth)acrylate, phenyl (meth)acrylate, vinyl chloride, vinyl fluoride, vinyl acetate, vinyl pivalate, vinyl 2,2-dimethylbutanoate, vinyl 2,2-dimethylpentanoate, vinyl 2-methyl-2-butanoate, vinyl propionate, vinyl stearate, vinyl 2-ethyl-2-methylbutanoate, N-vinylacetamide, vinyl p-t-butylbenzoate, vinyl N,N-dimethylaminobenzoate, vinyl benzoate, styrene, o-, m- or p-chlorostyrene, α-methylstyrene, ethyl vinyl ether, hydroxybutyl monovinyl ether, t-amyl vinyl ether, cyclohexanedimethanol methyl vinyl ether, tetrafluoroethylene, and hexafluoropropene.

For further enhancing the film formability of the polymer, a polyfunctional acrylate may be added to the composition. Preferred examples of the polyfunctional acrylate are 1,4-butanediol diacrylate, 1,6-hexanediol diacrylate, 1,9-nonanediol diacrylate, neopentylglycol diacrylate, triethylene glycol diacrylate, dipropylene glycol diacrylate, tripropylene glycol diacrylate, tetraethylene glycol diacrylate, trimethylolpropane triacrylate, trimethylol EO-added triacrylate, pentaerythritol triacrylate, trisacryloxyethyl phosphate, bisphenol A EO-added diacrylate, bisphenol A glycidyl diacrylate (Osaka Organic Chemical's trade name, Biscote 700), and polyethylene glycol diacrylate.

A liquid-crystalline polymerizable compound may be used for controlling the temperature range of the liquid crystalline phase of the polymer. Preferred examples of the liquid-crystalline polymerizable compound are shown below.

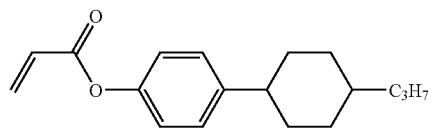 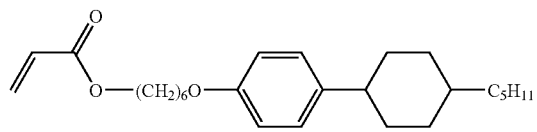

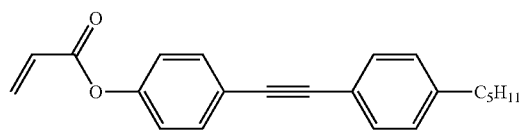 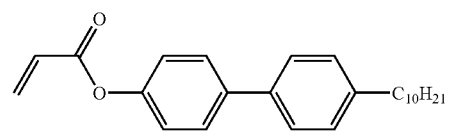

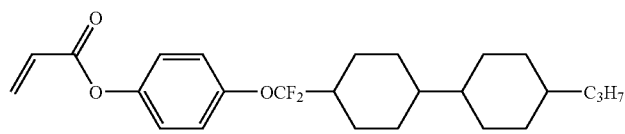 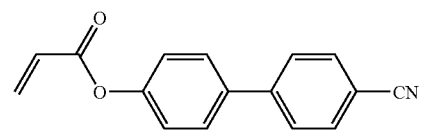

-continued

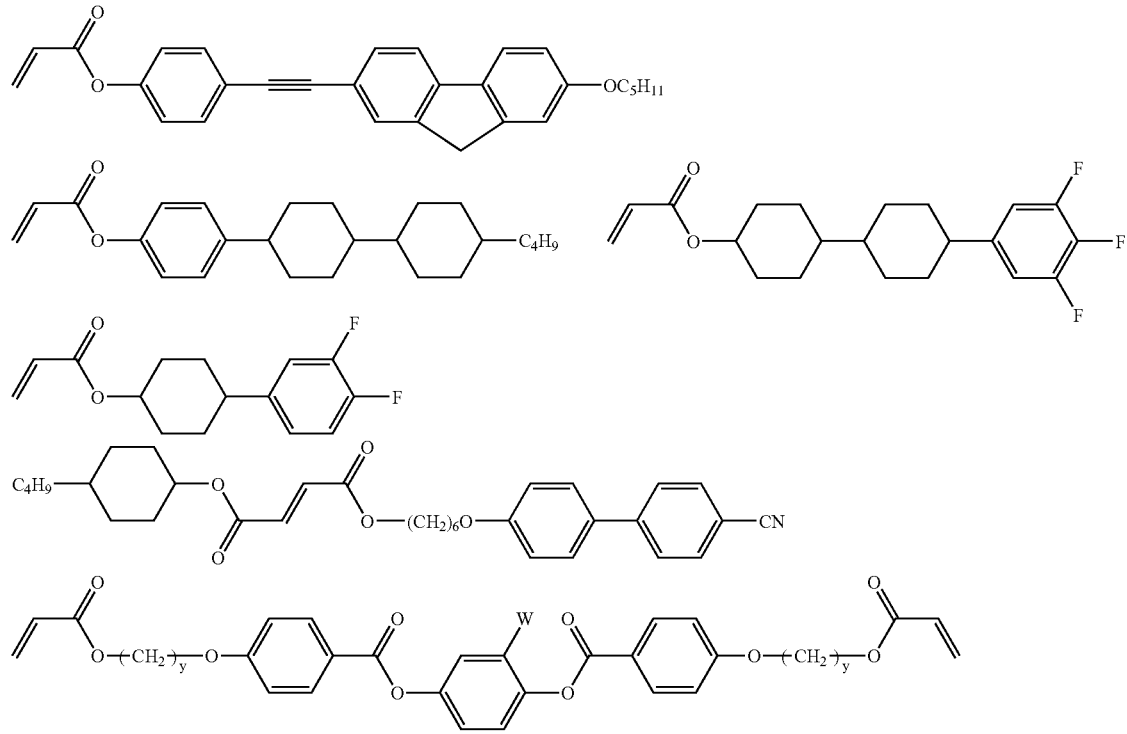

In the above formula, W represents hydrogen, fluorine, chlorine or —CH$_3$, and y indicates an integer of from 1 to 20.

Using compound (1), polymer (2) of thermoplastic resin may be produced. Preferably, the thermoplastic resin has a weight-average molecular weight of from 500 to 100,000, more preferably from 1,000 to 50,000, even more preferably from 2,000 to 10,000. In producing the thermoplastic resin, the degree of polymerization of the resin must not be too large, or the weight-average molecular weight thereof must be controlled to fall within the above-mentioned range.

Using compound (1), polymer (2) of thermosetting resin may be produced. Thermosetting polymer (2) has a three-dimensional crosslinked structure and is insoluble and infusible. Therefore, its molecular weight could not be measured. When compound (1) is copolymerized with a polyfunctional monomer such as polyfunctional acrylate, thermosetting resin may be readily produced.

For producing polymer (2), it is desirable to select the method of polymerization in accordance with the use of the polymer. For example, when optically-anisotropic films such as retardation film or polarizing element are produced, it is desirable that the polymerization is performed in liquid-crystalline state. Therefore for producing the polymer for these, therefore, preferred is a method of applying energy of UV rays, electron rays or the like to compound (1). When polymer (2) is liquid-crystalline, thin films formed of it may also have the same applications.

Polymer (2) obtained through thermal polymerization or photopolymerization may be utilized for various protective films, alignment films, viewing angle compensators, etc. Since polarized UV rays serve to polymerize a polymerizable compound into a polymer of which the molecular orientation is shifted in the direction of the polarized light, the polymer is applicable to alignment films not requiring rubbing. The alignment films may be formed, for example, by spin coating, Langmuir-Blodgett's technique, or printing. Preferably, the thickness of the alignment films to be obtained herein is from 1 to 100 nm in point of alignment control.

Compound (1) is highly polymerizable in light, and it may be photopolymerized as such to give polymer (2). To shorten the reaction time, an initiator may be used. Preferred examples of the initiator for radical polymerization in light are 2-hydroxy-2-methyl-1-phenylpropan-1-one (trade name: Darocure 1173), 1-hydroxycyclohexyl phenyl ketone (trade name: Irgacure 184), 2,2-dimethoxy-1,2-diphenylethan-1-one (trade name: Irgacure 651), Irgacure 500, Irgacure 2959, Irgacure 907, Irgacure 369, Irgacure 1300, Irgacure 819, Irgacure 1700, Irgacure 1800, Irgacure 1850, Darocure 4265, Irgacure 784, p-methoxyphenyl-2,4-bis(trichloromethyl)triazine, 2-(p-butoxystyryl)-5-trichloromethyl-1,3,4-oxadiazole, 9-phenylacridine, 1-(4-isopropylphenyl)-2-hydroxy-2-methylpropan-1-one, benzyldimethyl ketal, 2-methyl-1-[4-(methylthio)phenyl]-2-morpholinopropan-1-one, and a mixture of 2,4-diethylxanthone/methyl p-dimethylaminobenzoate.

Preferred examples of the initiator for radical polymerization under heat are benzoyl peroxide, diisopropylperoxy dicarbonate, t-butylperoxy-2-ethyl hexanoate, t-butylperoxy pivalate, di-t-butyl peroxide, t-butylperoxy diisobutyrate, lauroyl peroxide, dimethyl 2,2'-azobisisobutyrate, azobisisobutyronitrile, azobiscyclohexanecarbonitrile. Thermal polymerization is generally effected at a reaction temperature of 0 to 150° C. for 1 to 100 hours. In general, thermal polymerization is assisted by the initiator.

Preferred examples of the catalyst for anionic polymerization, cationic polymerization, coordination polymerization or living polymerization are alkali metal alkyls such as n-C$_4$H$_9$Li, t-C$_4$H$_9$Li, R$_3$Al, aluminium compounds and transition metal compounds.

Solvent may be used inpolymerization. Preferred examples of the solvent are benzene, toluene, xylene, mesitylene, hexane, heptane, octane, nonane, decane, tetrahydrofuran, N-methyl-2-pyrrolidone, N,N-dimethylformamide, dimethylsulfoxide, and mixed solvents of these. When alignment films, antireflection films, viewing angle compensators and others are produced through photopolymerization, a composition that contains a solvent may be applied onto a substrate in a mode of spin coating, the solvent is removed and then the coated substrate may be exposed to light to polymerize the composition thereon.

Dissolved in a solvent, polymer (2) may be formed into various shaped articles such as films. Preferred examples of the solvent are N-methyl-2-pyrrolidone, dimethylsulfoxide, N,N-dimethylacetamide, N,N-dimethylformamide, N,N-dimethylacetamidedimethyl acetal, tetrahydrofuran, chloroform, 1,4-dioxane, bis(methoxyethyl) ether, γ-butyrolactone, tetramethylurea, trifluoroacetic acid, ethyl trifluoroacetate, and hexafluoro-2-propanol. Not limited to these, the solvent may also be a mixture thereof with any other ordinary organic solvent such as acetone, benzene, toluene, heptane, methylene chloride.

The optically-anisotropic material of the invention may be produced, for example, according to the method mentioned below. Polymer (2) is dissolved in an organic solvent, and the resulting solution is applied onto a previously-oriented transparent substrate. This is heated up to a temperature not lower than the glass transition point of polymer (2). Next, this is left cooled to form a uniformly-oriented, thin polymer film. This is the intended, optically-anisotropic material. The transparent substrate may be a glass plate or a polymer film. Examples of the polymer film are triacetyl cellulose, JSR's Arton (trade name), Nippon Zeon's Zeonex (trade name) and Zeonoa (trade name), Mitsui Chemical's Apel (trade name). Preferred coating methods for producing films having a uniform thickness are spin coating, microgravure coating, gravure coating, wire bar coating, dipping, spraying, meniscus coating, etc.

The optimum thickness of the optically-anisotropic materials varies, depending on the retardation that corresponds to the intended devices and on the birefringence of liquid-crystal films. Therefore, its range could not be strictly defined, but the preferred thickness of liquid-crystal films is generally from 0.05 to 50 μm, more preferably from 0.1 to 20 μm, even more preferably from 0.1 to 10 μm. The haze of the optically-anisotropic materials is preferably at most 1.5%, more preferably at most 1.0%. The transmittance of the articles that correlates to the haze thereof is preferably at least 80%, more preferably at least 85%. It is desirable that the transmittance satisfies the condition in the range of visible light. The haze limit of at most 1.5% is one preferred condition for not detracting from the polarizing capability of the optically-anisotropic materials. The transmittance limit of at least 80% is one preferred condition for ensuring the brightness of the optically-anisotropic materials that are used in liquid-crystal display devices.

As being optically anisotropic, polymer (2) may form retardation films by itself. Combined with any other retardation film, the polymer may be used for polarizing films, circular polarizing films, elliptical polarizing films, antireflection films, color compensators, viewing angle compensators, etc.

When mixed with ferroelectric liquid crystal or antiferroelectric liquid crystal and polymerized, compound (1) may form ferroelectric liquid-crystal display devices or antiferroelectric liquid-crystal display devices that are stabilized through polymerization. Concrete methods for constructing display devices are known in references (e.g., J. of Photopoly. Sci. Technol., 2000, 13(2), 295-300).

EXAMPLES

The invention is described in more detail with reference to the following Examples, which, however, are not intended to restrict the scope of the invention. The compound structure was confirmed through nuclear magnetic resonance spectroscopy, mass spectroscopy or the like. The unit of the phase transition temperature is ° C. C indicates crystal; SmX or Sm indicates smectic phase; Nem indicates nematic phase; I indicate isotropic liquid crystalline phase, and the parenthesized expression indicates monotropic liquid-crystalline phase. For example, "C 100.0 Nem" means that the phase transition temperature from crystal to nematic phase is 100.0° C. The phase transition temperature was measured through DSC and polarizing microscope. The volume unit, liter is represented by a symbol L.

For measuring the weight-average molecular weight and the number-average molecular weight, used were Shimadzu's Shimadzu LC-9A Model gel permeation chromatography (GPC) and Showa Denko's column Shodex GF-7M HQ (development solvent: DMF or THF). The pencil hardness was measured according to a JIS method, "JIS-K-5400, 8.4 Pencil Scratch Test".

Example 1

Production of 4-(4-pentylbenzoyloxy)phenyl Vinyl Ketone

Compound (1-5-11) was produced according to the following reaction scheme:

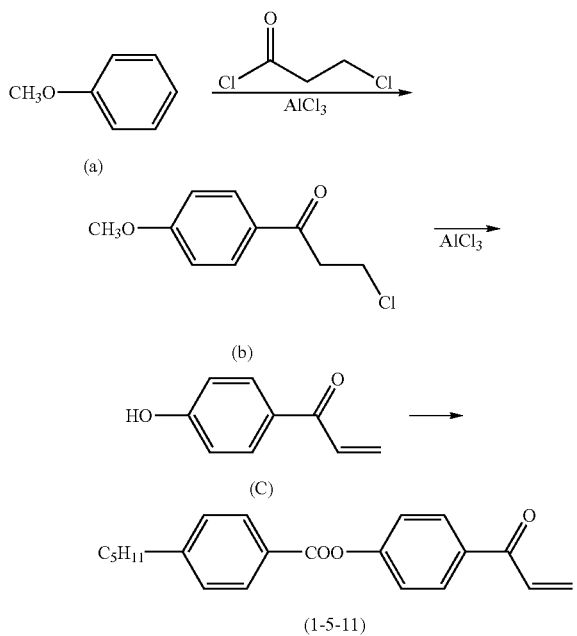

Step 1, Production of 2-chloroethyl 4-methoxyphenyl Ketone (b):

A mixture of anisole (a) (230.8 g), aluminium chloride (298.8 g) and methylene chloride (500 mL) was cooled in an ice bath. To this, dropwise added was a mixture of 3-chloropropionyl chloride (271 g) and methylene chloride (200 mL) while the inner temperature was kept at 10° C. or lower.

The cooling bath was removed, and this was heated with a mantle heater for 30 minutes under reflux, and then the reaction liquid was poured into a mixture of ice and hydrochloric acid. This was transferred into a separating funnel, and the separated organic phase was washed with water. The solvent was evaporated away under reduced pressure, and the residue was recrystallized from Solmix. This was taken out through filtration and dried to obtain 72.6 g of colorless crystals, 2-chloroethyl 4-methoxyphenyl ketone (b).

m.p. 59-64° C.

Step 2, Production of 4-hydroxyphenyl Vinyl Ketone (c):

2-Chloroethyl 4-methoxyphenyl ketone (b) (69.4 g) was dissolved in methylene chloride (200 mL), to which was added aluminium chloride (130.8 g) little by little. The resulting mixture was heated with a mantle heater for 2 hours under reflux. After the reaction, the reaction liquid was cooled and poured into ice, and the organic phase was extracted out with ethyl acetate (200 mL) and transferred into a separating funnel. The organic phase was washed with water, and then processed with aqueous 2 M NaOH solution to extract out the intended product into the solution. The aqueous alkali solution was acidified with 6 M hydrochloric acid, and then again extracted with ethyl acetate. The solvent was evaporated away under reduced pressure, and the residue was recrystallized from toluene to obtain 37.9 g of colorless crystals, 4-hydroxyphenyl vinyl ketone (c).

m.p. 99-102.6° C.

Step 3, Production of 4-(4-pentylbenzoyloxy)phenyl Vinyl Ketone (1-5-11):

A mixture of 4-hydroxyphenyl vinyl ketone (c) (1.0 g), 4-pentylbenzoic acid (1.2 g), DCC (1.9 g), DMAP (0.1 g) and methylene chloride (30 mL) was stirred at room temperature for 12 hours. The white solid precipitated was filtrated out, and the solvent was evaporated away from the filtrate. The residue was dissolved in ethyl acetate, and washed with aqueous 2 M NaOH solution and then with water. The residue was purified through column chromatography (eluent: toluene) and then through recrystallization (ethanol) to obtain 0.4 g of colorless crystals, compound (1-5-11). The NMR and MS spectra of the compound well support the structure thereof.

Phase transition points: C 59.8 Nem 74.3 I.

Example 2

Production of 4-(4'-heptyl-1,1'-biphenyl-4-carbonyloxy)phenyl Vinyl Ketone (1-13-8)

The compound (1-13-8) was produced according to the following reaction scheme:

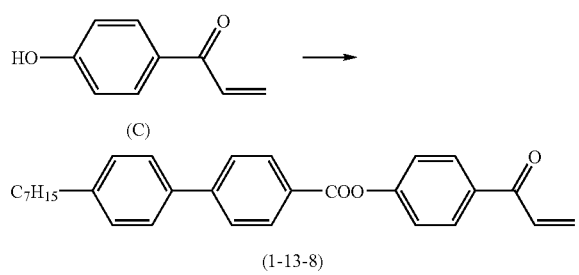

(1-13-8)

A mixture of 4-hydroxyphenyl vinyl ketone (c) (1 g), 4'-heptyl-1,1'-biphenyl-4-carboxylic acid (1.8 g), DCC (1.9 g) DMAP (0.1 g) and methylene chloride (30 mL) was stirred at room temperature for 12 hours. The white solid precipitated was filtrated out, and the solvent was evaporated away from the filtrate. The residue was dissolved in ethyl acetate, and washed with aqueous 2 M NaOH solution and then with water. The solvent was evaporated away, and the residue was purified through column chromatography (eluent: toluene) and then through recrystallization (ethanol) to obtain 0.5 g of colorless crystals, compound (1-13-8). The NMR and MS spectra of the compound well support the structure thereof.

Phase Transition Points: C 118.8 Nem.

The compound (1-13-8) polymerizes at 120° C. or higher. Therefore, its clearing point was impossible to measure.

Example 3

Production of 4-(4-propylbenzoyloxy)phenyl Vinyl Ketone (1-5-10)

Using 4-propylbenzoic acid in place of 4-pentylbenzoic acid, compound (1-5-10) was obtained according to the method of Example 1.

Phase Transition Points: C 71.0 (Nem 69) I.

Example 4

Production of 4-[4-(2-methylbutyl)benzoyloxy]phenyl Vinyl Ketone (1-5-12)

Using 4-(2-methylbutyl)benzoic acid in place of 4-pentylbenzoic acid, 4-[4-(2-methylbutyl)benzoyloxy]phenyl vinyl ketone (1-5-12) was obtained according to the method of Example 1.

Phase Transition Points: C 52.7 (Nem 29) I.

Example 5

Production of 4-(4-cyanobenzoyloxy)phenyl Vinyl Ketone (1-5-13)

Using 4-cyanobenzoic acid in place of 4-pentylbenzoic acid, compound (1-5-13) was obtained according to the method of Example 1.

m.p. 122° C.

Example 6

Production of 4-(4-hexyloxybenzoyloxy)phenyl Vinyl Ketone (1-5-14)

Using 4-hexyloxybenzoic acid in place of 4-pentylbenzoic acid, compound (1-5-14) was obtained according to the method of Example 1.

Phase Transition Points: C 80 SmX 94 Nem 107 I.

Example 7

According to the method of Examples 1 to 6, produced were compounds (1-1-1) to (1-59-3).

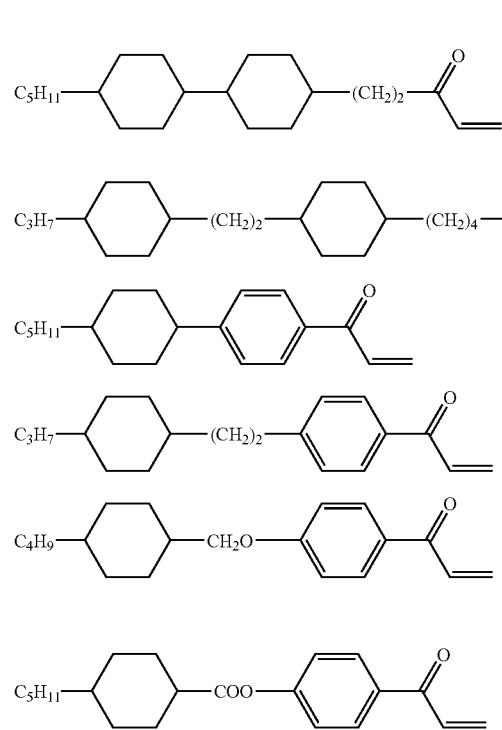
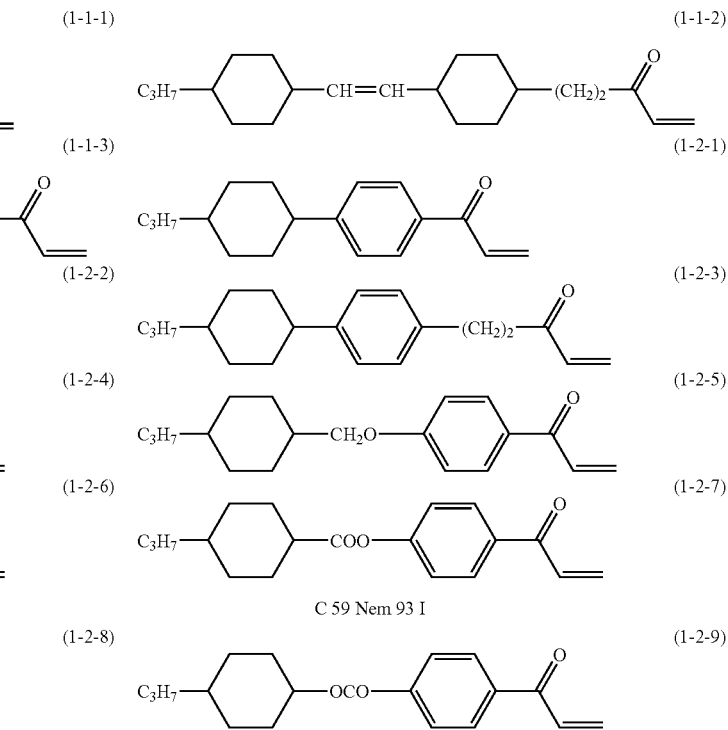

-continued
(1-4-4) 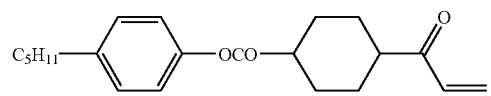
(1-4-5) 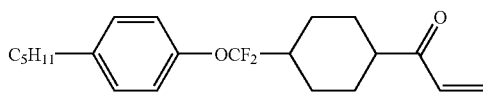
(1-4-6) 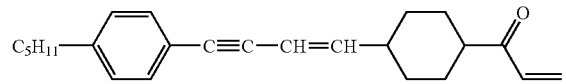
(1-5-1) 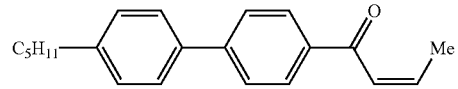
(1-5-2) 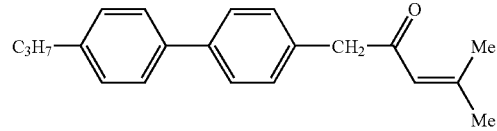
(1-5-3) 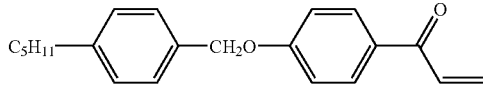
(1-5-4) 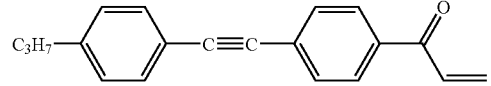
(1-5-5) 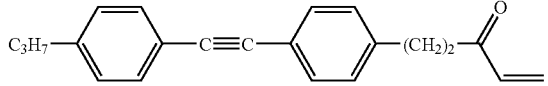
(1-5-6) 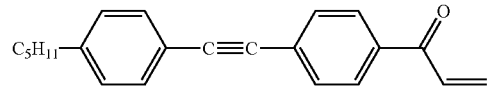
(1-5-7) 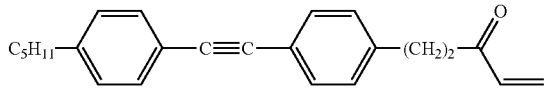
(1-5-8) 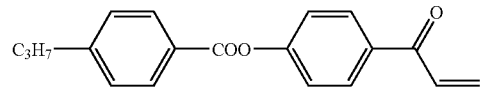
(1-5-9) 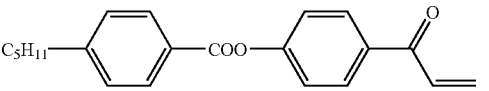
(1-5-10) 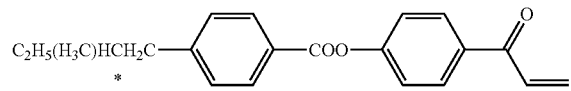
C 71.0 (Nem 69) I
(1-5-11) 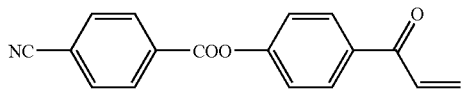
C 59.8 Nem 74.3 I
(1-5-12) 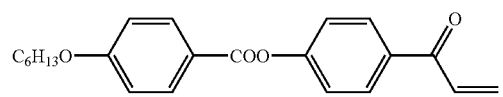
C 52.7 (Nem 29) I
(1-5-13) 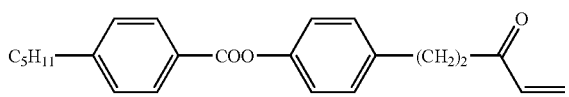
C 122 I
(1-5-14) 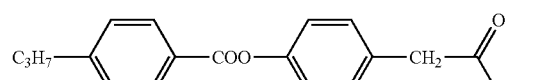
C 80 SmX 94 Nem I
(1-5-15) 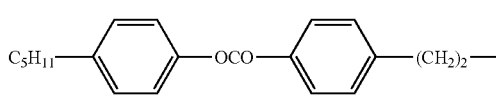
(1-5-16) 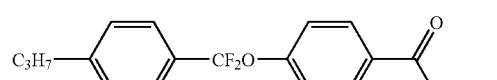
(1-5-17) 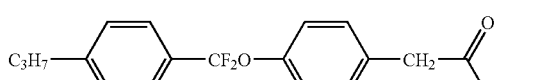
(1-5-18) 
(1-5-19)
(1-5-20) 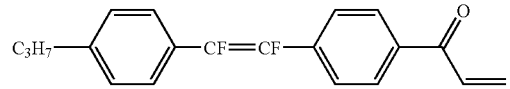
(1-5-21)

-continued
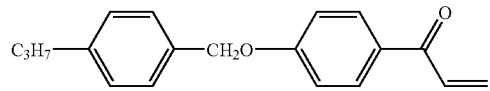  (1-5-22)
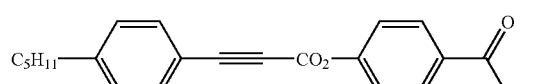  (1-5-23)
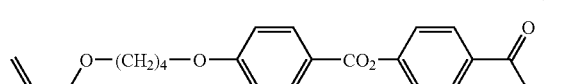  (1-5-24)
  (1-5-25)
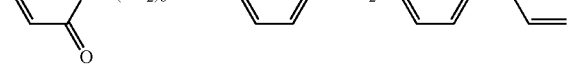  (1-5-26)
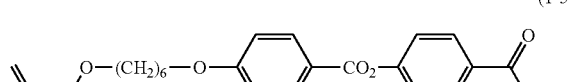  (1-5-27)
C 81.6 (Nem 79.2) I
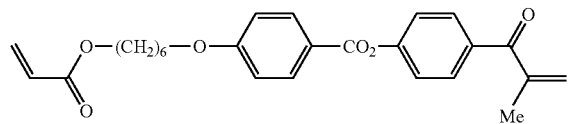  (1-5-28)
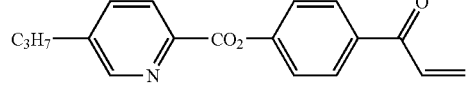  (1-5-29)
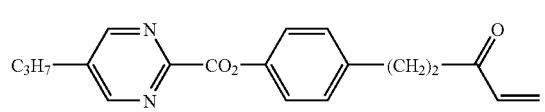  (1-5-30)
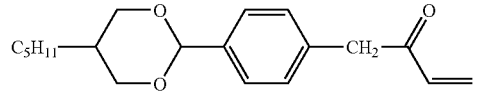 (1-6-1)
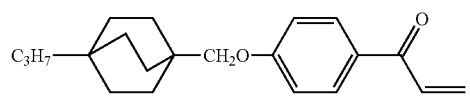 (1-6-2)
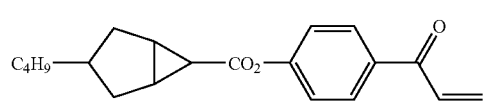 (1-7-1)
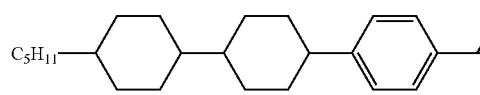 (1-7-2)
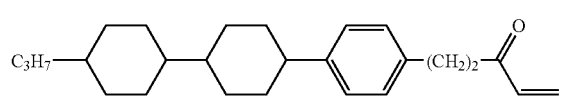 (1-8-1)
 (1-8-2)
 (1-9-1)
(1-9-2)
(1-9-3)
(1-10-1)
(1-11-1)
(1-11-2)
(1-11-3)
(1-11-4)
(1-11-5)

-continued
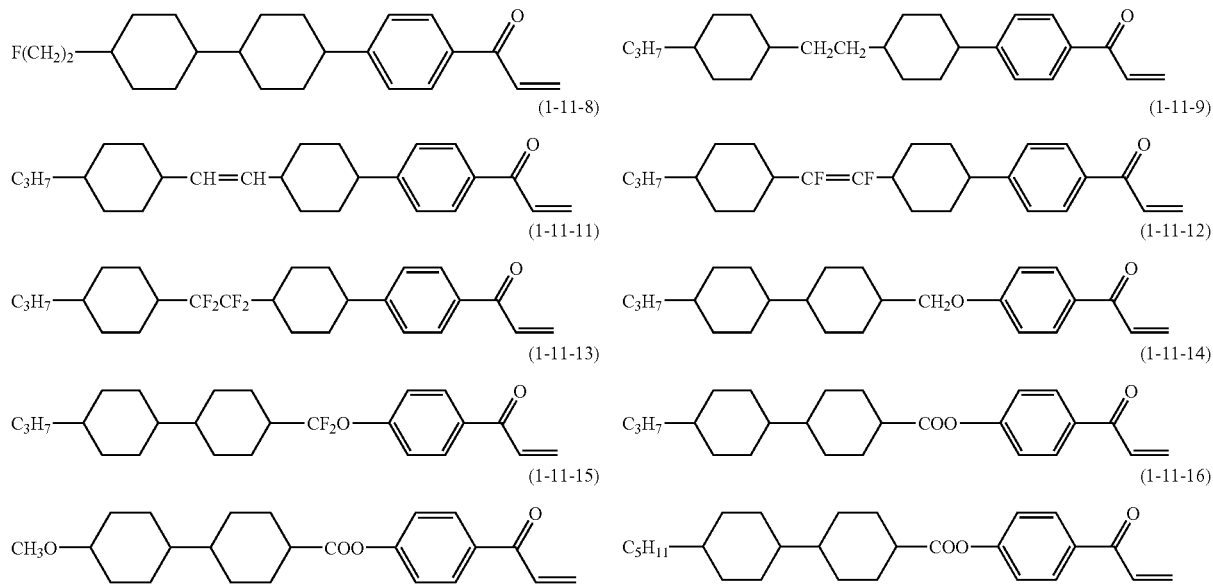
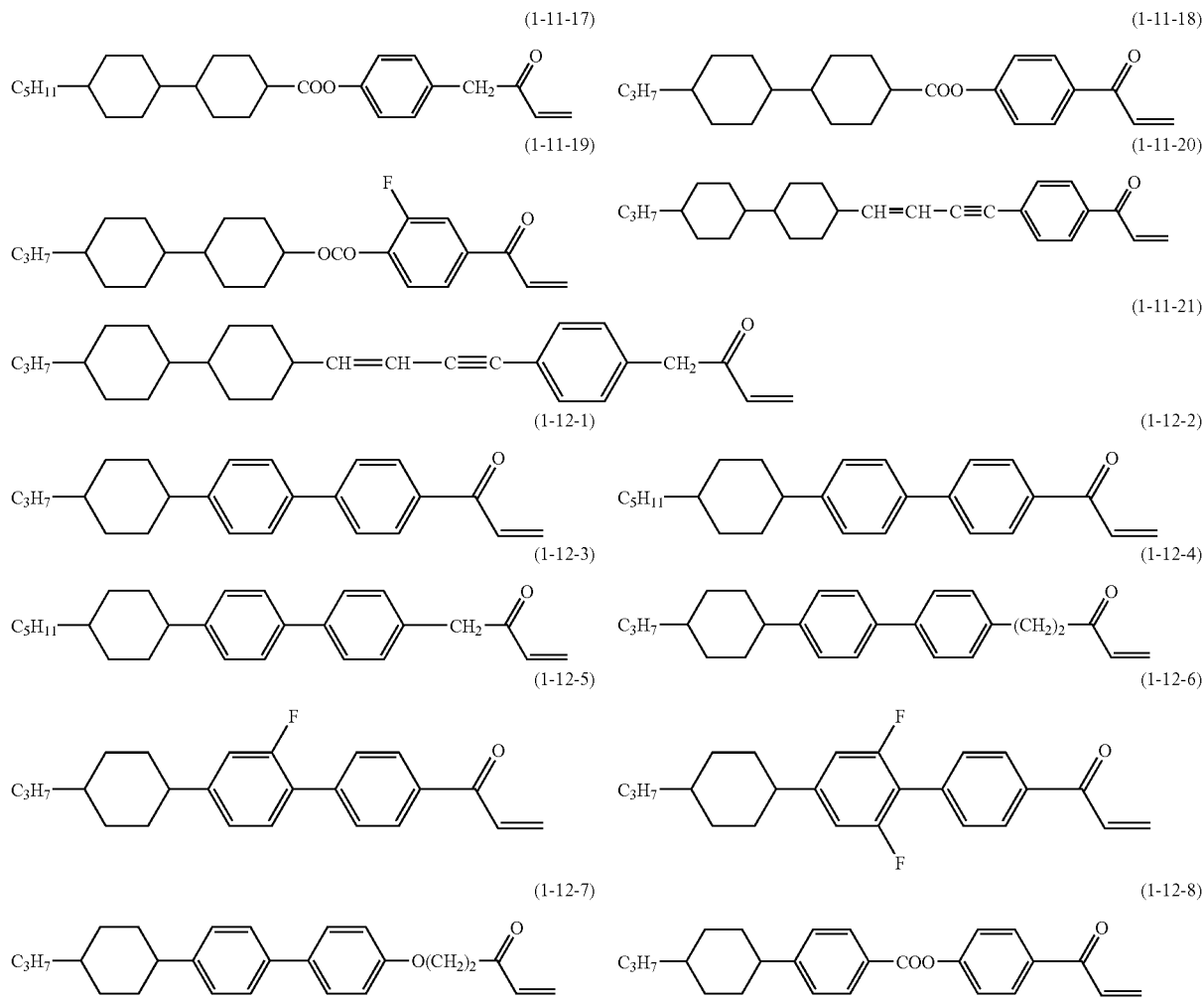

-continued
(1-12-9)
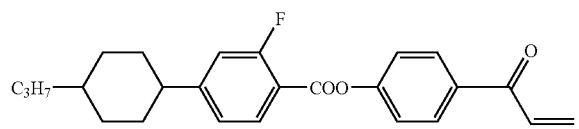
(1-12-10)
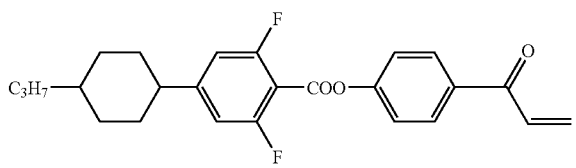
(1-12-11)
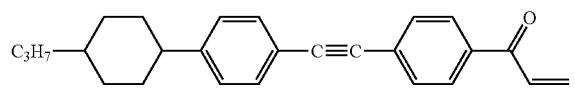
(1-12-12)
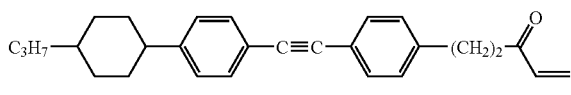
(1-12-13)
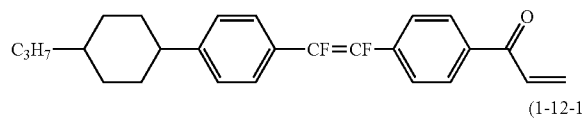
(1-12-14)
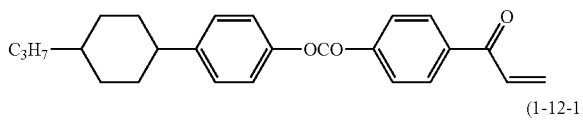
(1-12-15)
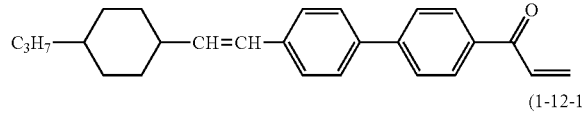
(1-12-16)
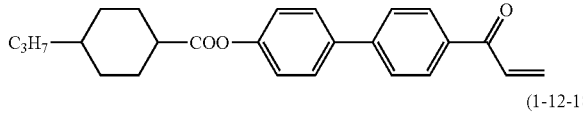
(1-12-17)
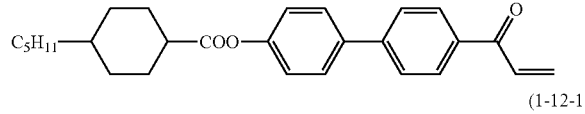
(1-12-18)
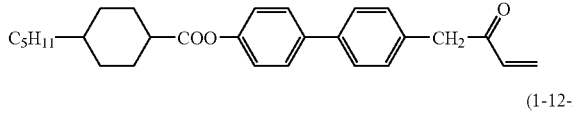
(1-12-19)
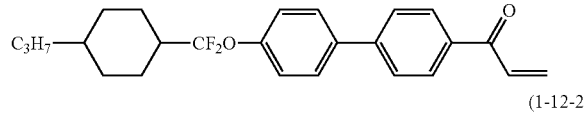
(1-12-20)
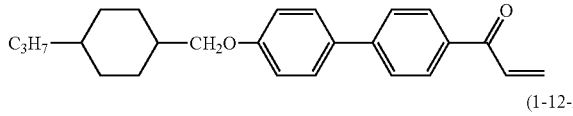
(1-12-21)
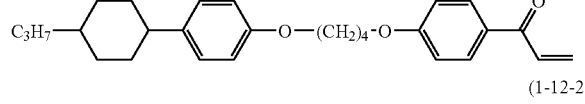
(1-12-22)
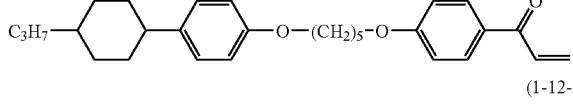
(1-12-23)
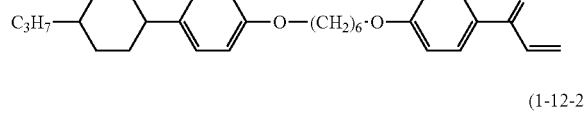
(1-12-24)
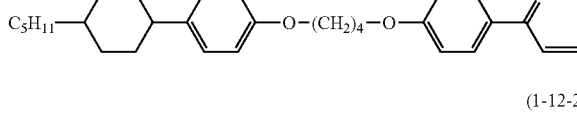
(1-12-25)
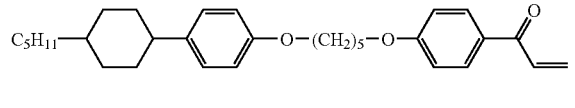
(1-12-26)
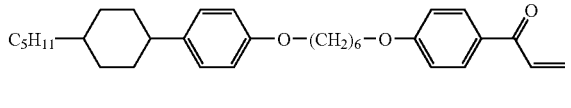
(1-12-27)
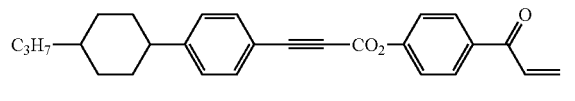
(1-12-28)
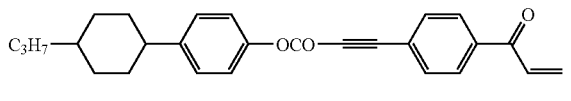
(1-13-1)
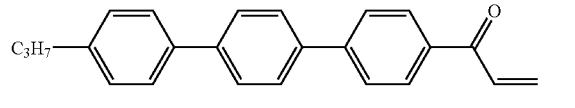
(1-13-2)
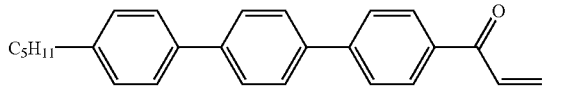
(1-13-3)
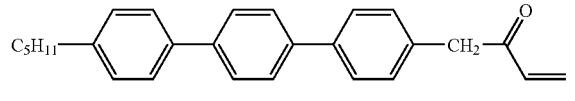
(1-13-4)
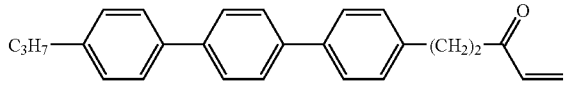

-continued
(1-13-5)
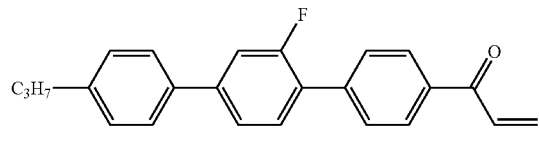
(1-13-6)
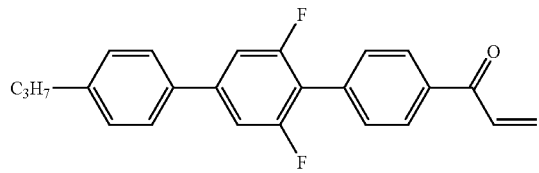
(1-13-7)
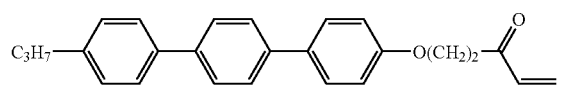
(1-13-8)
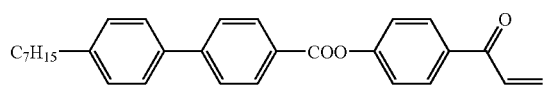
C 118.8 Nem
(1-13-9)
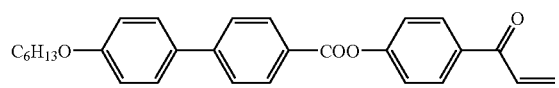
(1-13-10)
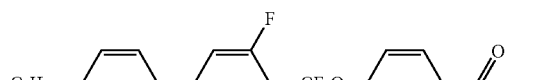
(1-13-11)
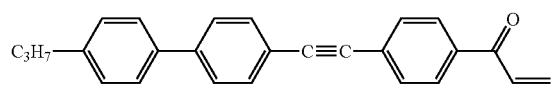
(1-13-12)
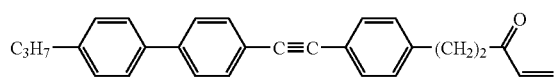
(1-13-13)
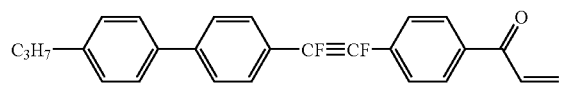
(1-13-14)
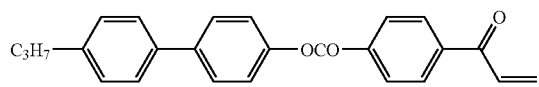
(1-13-15)
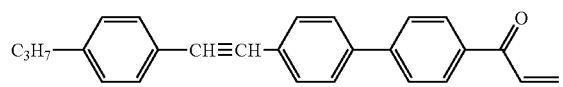
(1-13-16)
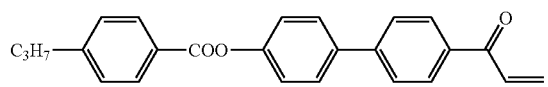
(1-13-17)
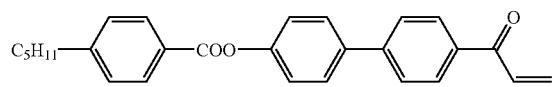
(1-13-18)
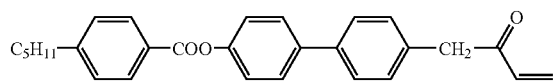
(1-13-19)
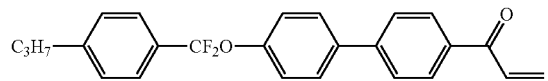
(1-13-20)
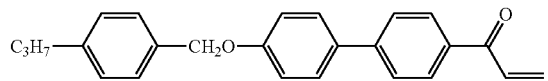
(1-13-21)
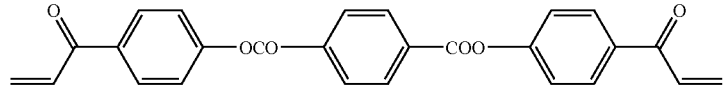
(1-13-22)
(1-13-23)
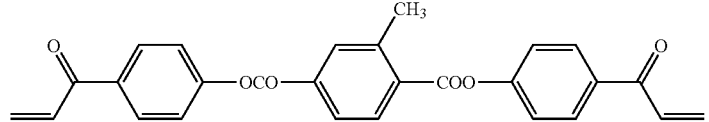
(1-13-24)
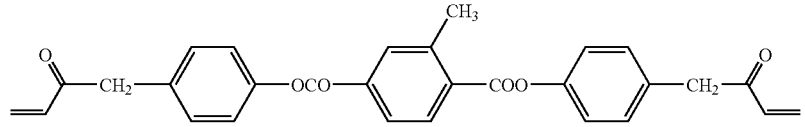

-continued
(1-13-25)
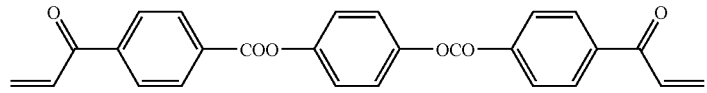
(1-13-26)
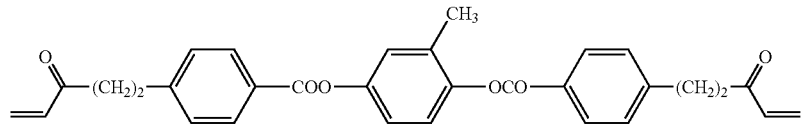
(1-13-27)
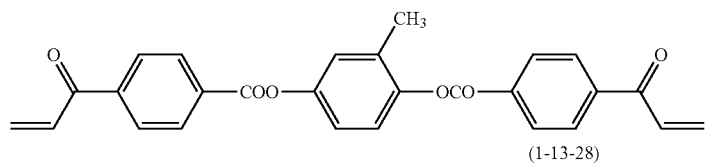
(1-13-28)
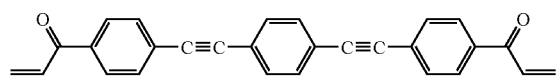
(1-13-29)
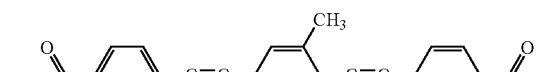
(1-13-30)
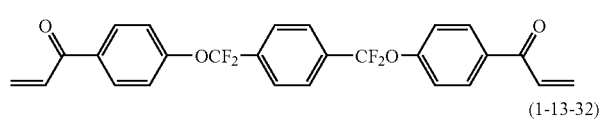
(1-13-31)
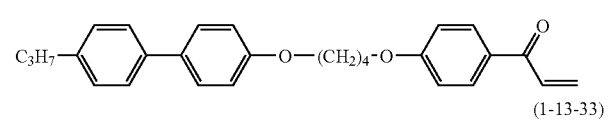
(1-13-32)
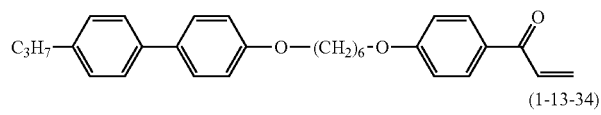
(1-13-33)
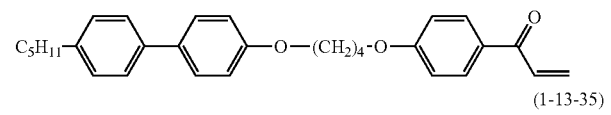
(1-13-34)
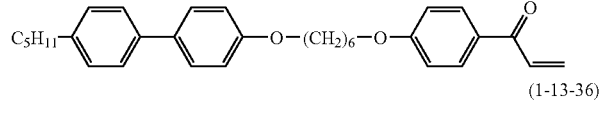
(1-13-35)
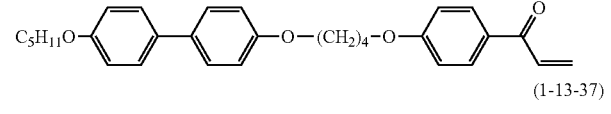
(1-13-36)
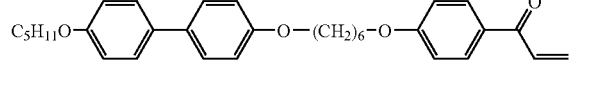
(1-13-37)
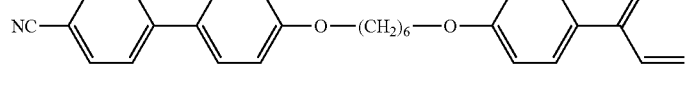
(1-13-38)
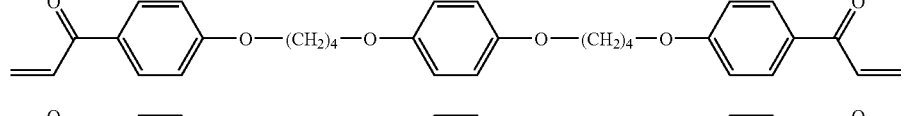
(1-13-39)
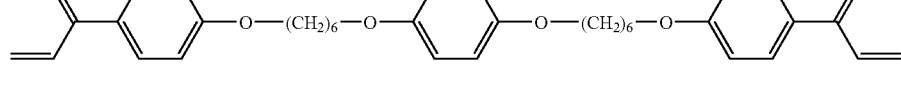
(1-13-40)
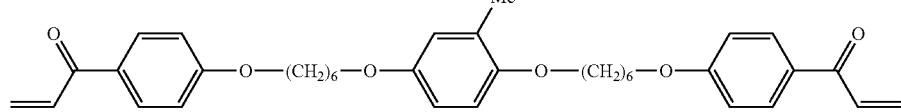
(1-13-41)
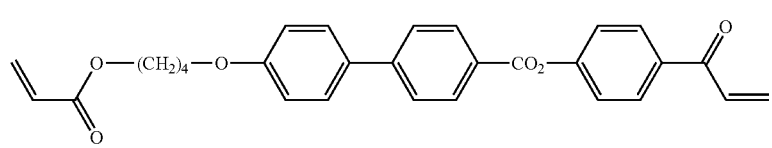

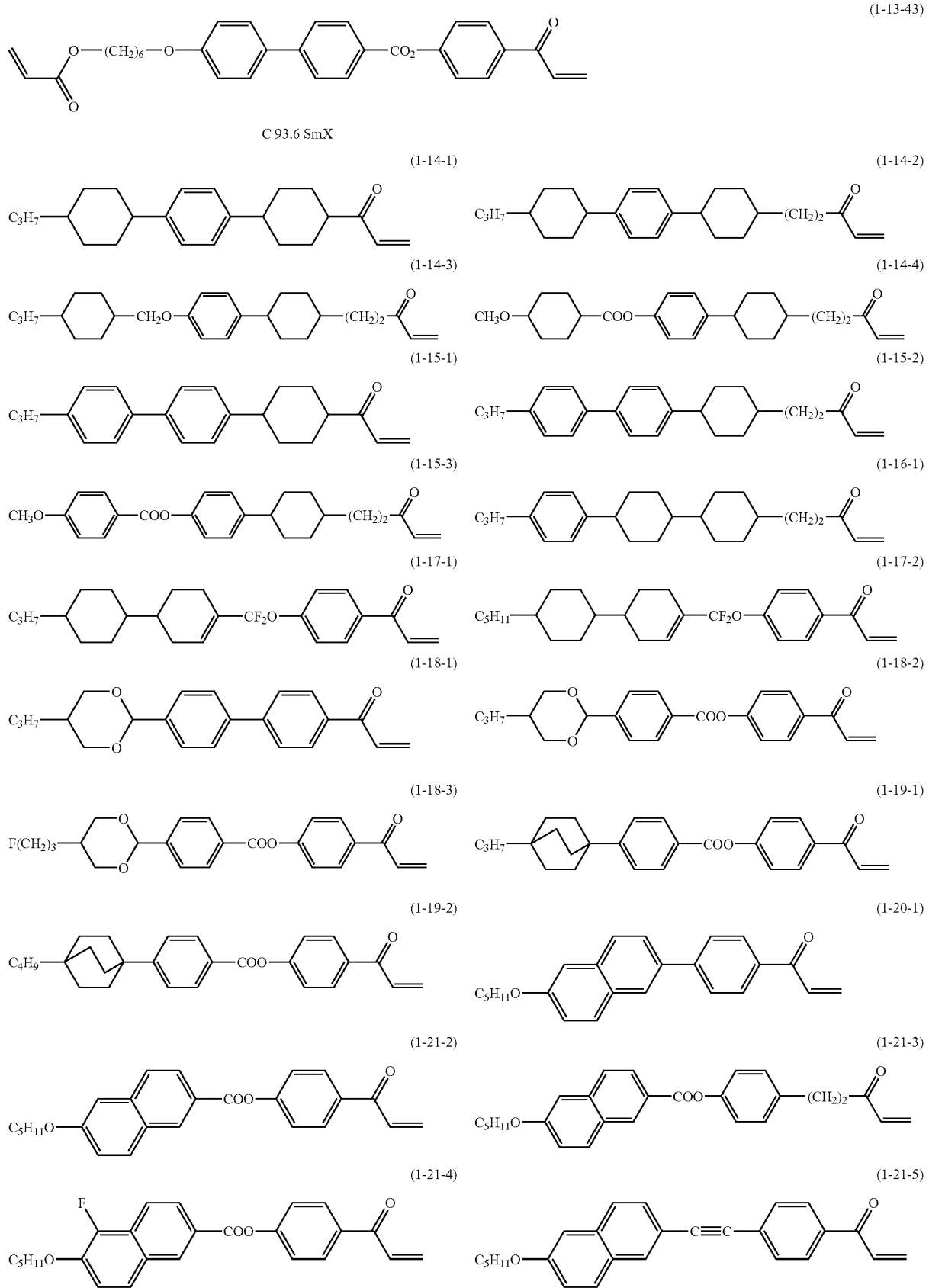

-continued
(1-21-1)
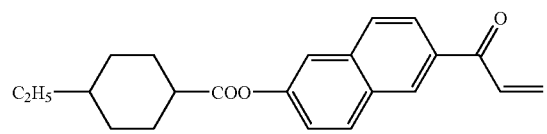
(1-21-2)
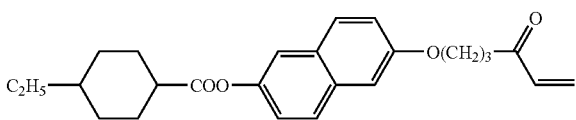
(1-22-1)
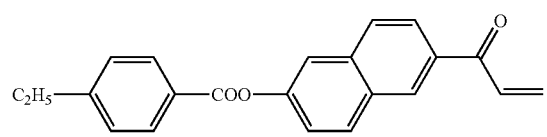
(1-22-2)
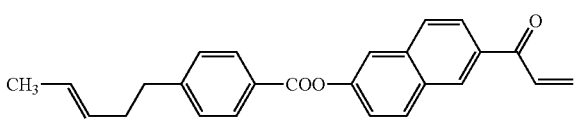
(1-22-3)
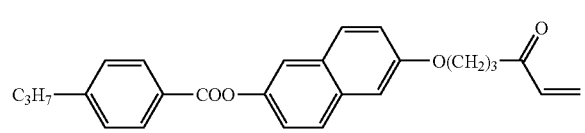
(1-22-4)
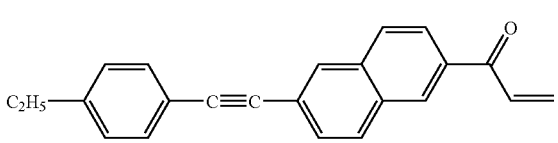
(1-23-1)
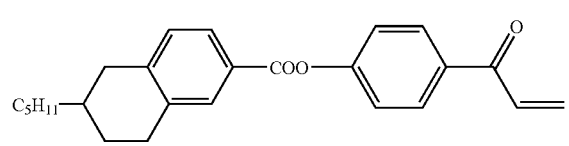
(1-23-2)
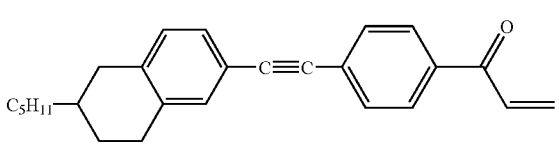
(1-24-1)
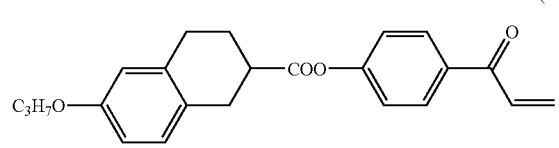
(1-24-2)
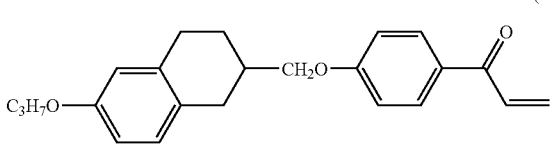
(1-25-1)
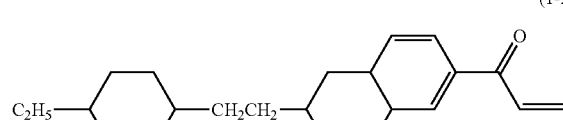
(1-25-2)
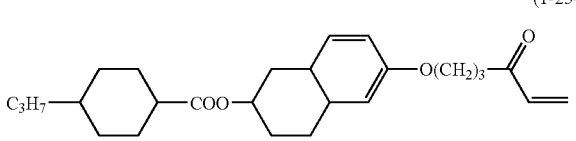
(1-25-3)
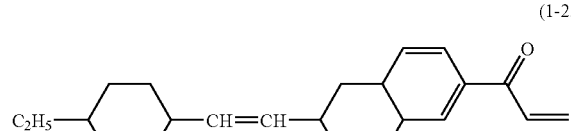
(1-26-1)
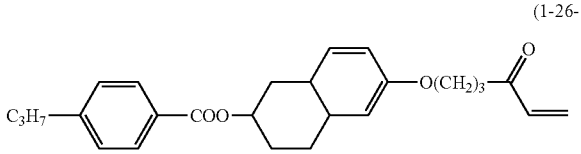
(1-26-2)
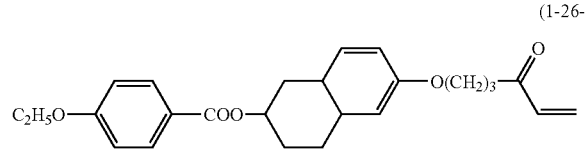
(1-27-1)
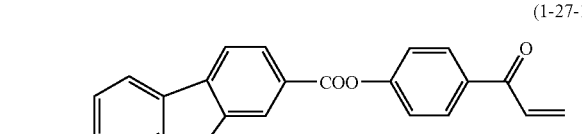
(1-27-2)
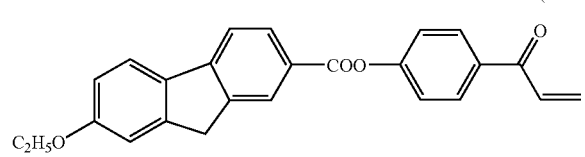
(1-27-3)
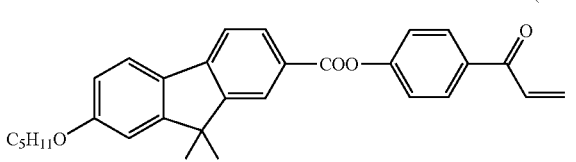

-continued
(1-27-4)
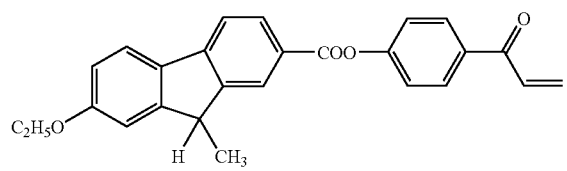
(1-27-5)
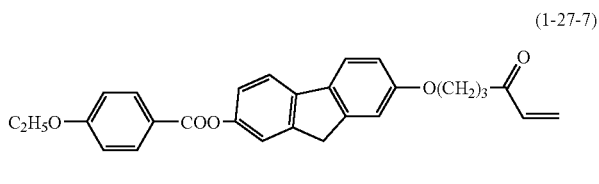
(1-27-6)
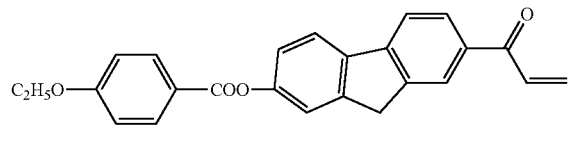
(1-27-7)
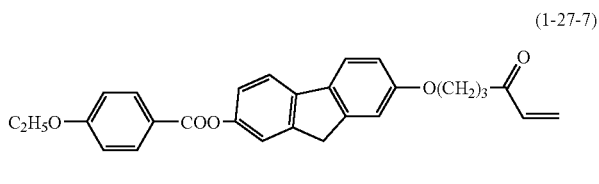
(1-28-1)
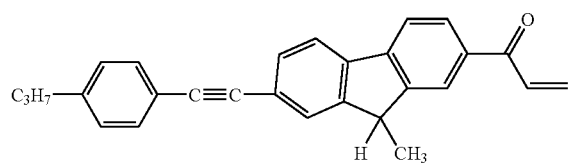
(1-28-2)
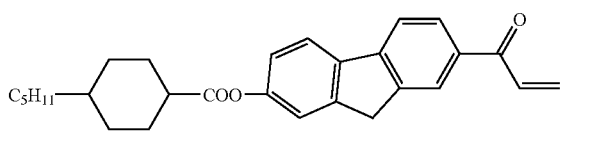
(1-28-3)
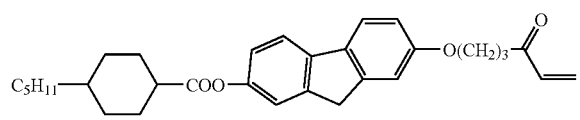
(1-30-1)
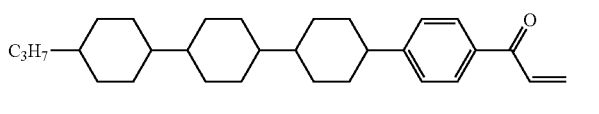
(1-30-2)
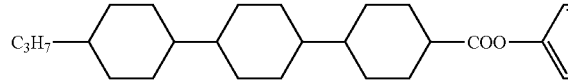
(1-30-3)
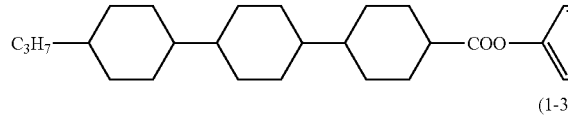
(1-31-1)
(1-31-2)
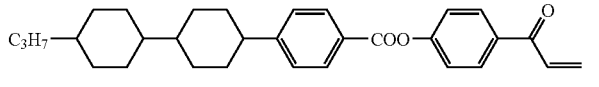
(1-31-3)
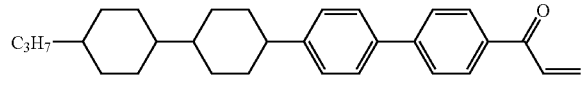
(1-31-4)
(1-31-5)
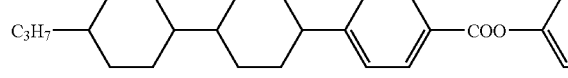
(1-31-6)
(1-32-1)
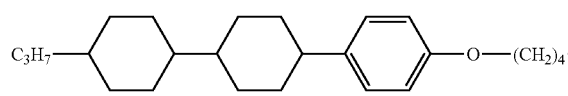
(1-32-2)

-continued
(1-32-3)
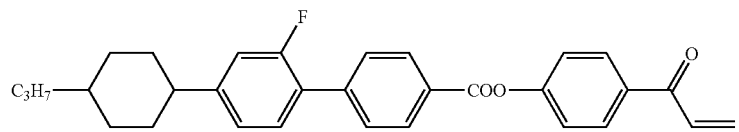
(1-32-4)
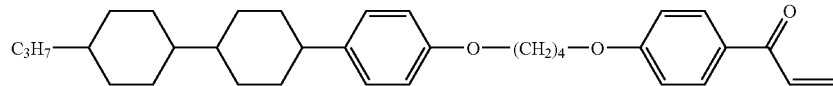
(1-32-5)
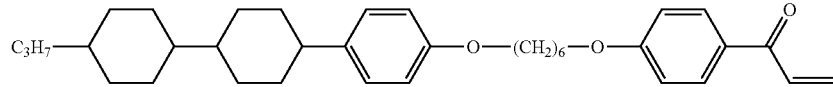
(1-33-1)
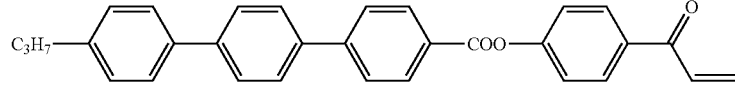
(1-34-1)
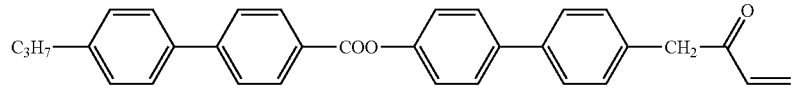
(1-35-1)
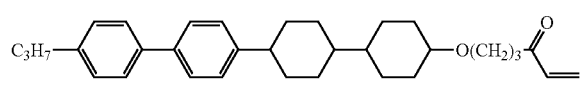
(1-36-1)
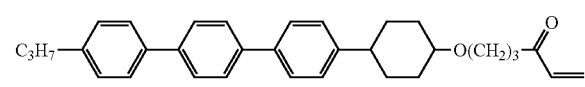
(1-37-1)
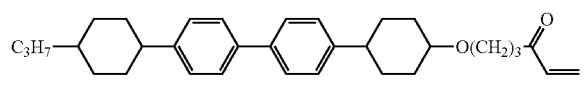
(1-38-1)
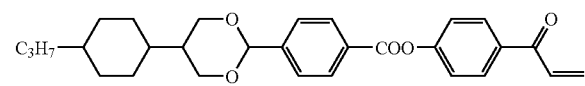
(1-39-1)
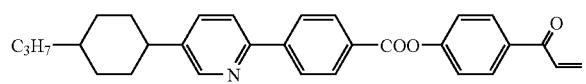
(1-40-1)
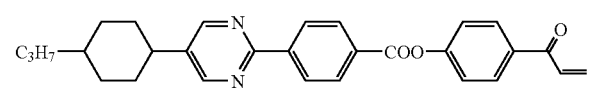
(1-41-1)
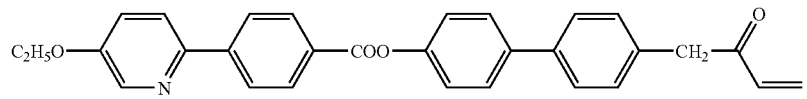
(1-42-1)
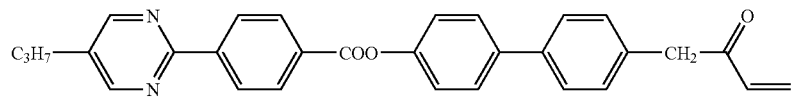
(1-42-1)
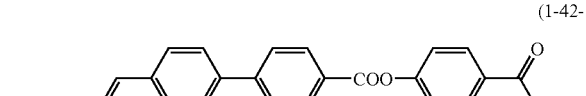
(1-42-2)
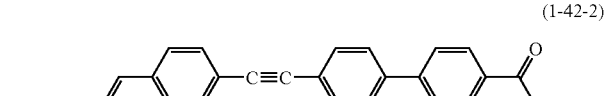
(1-42-3)
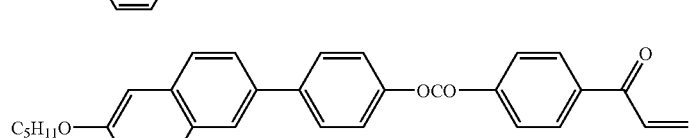
(1-42-4)
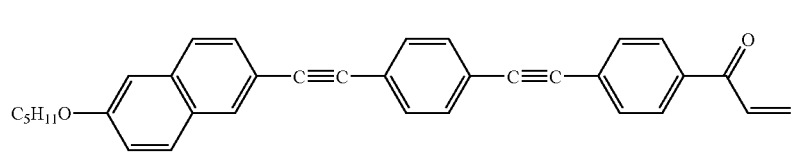

-continued
(1-43-1)
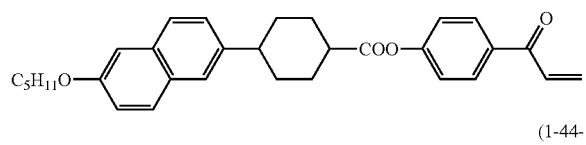
(1-43-2)
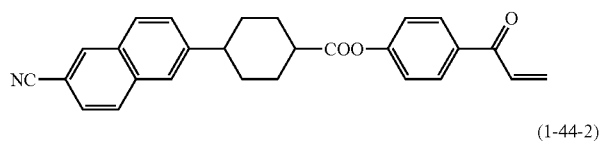
(1-44-1)
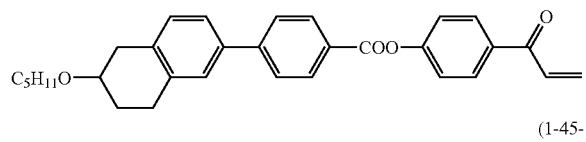
(1-44-2)
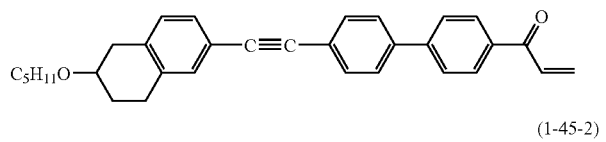
(1-45-1)
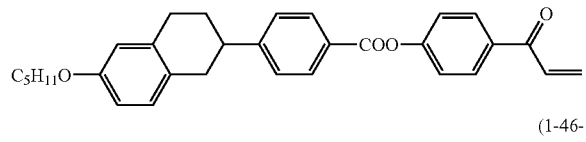
(1-45-2)
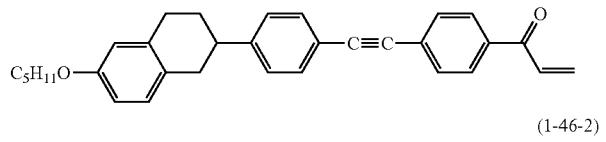
(1-46-1)
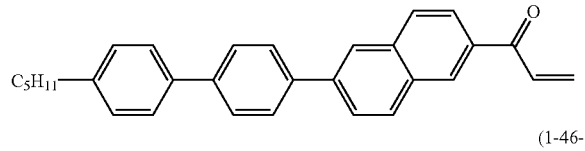
(1-46-2)
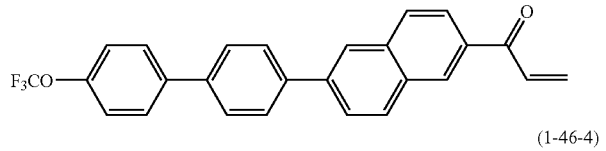
(1-46-3)
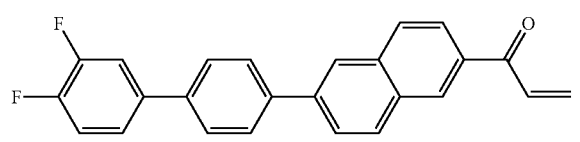
(1-46-4)
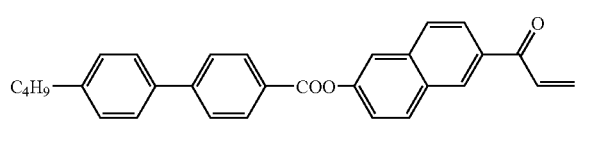
(1-46-5)
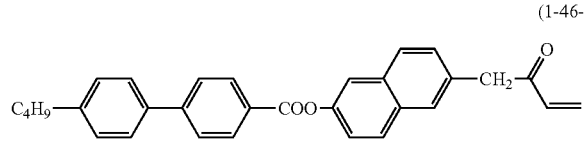
(1-46-6)
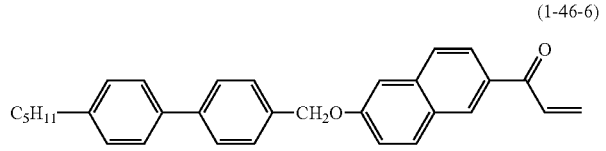
(1-46-7)
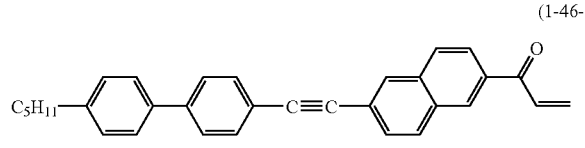
(1-46-8)
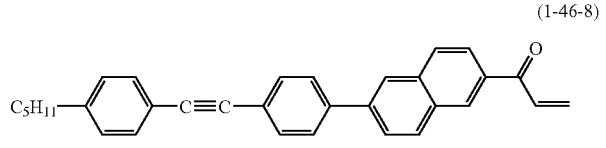
(1-46-9)
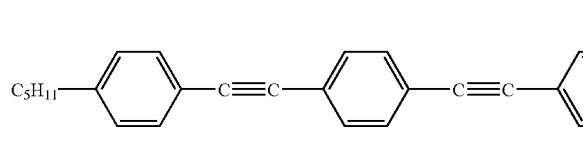
(1-46-10)
(1-47-1)
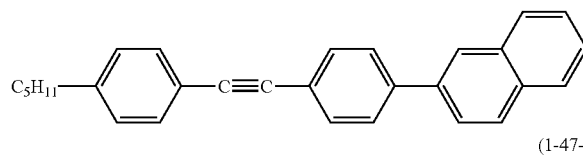
(1-47-2)
(1-47-3)
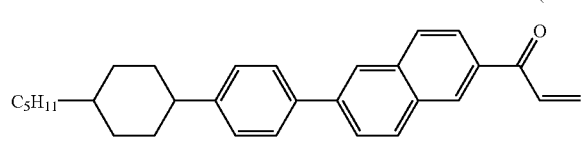
(1-47-4)
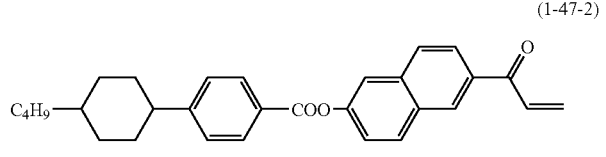

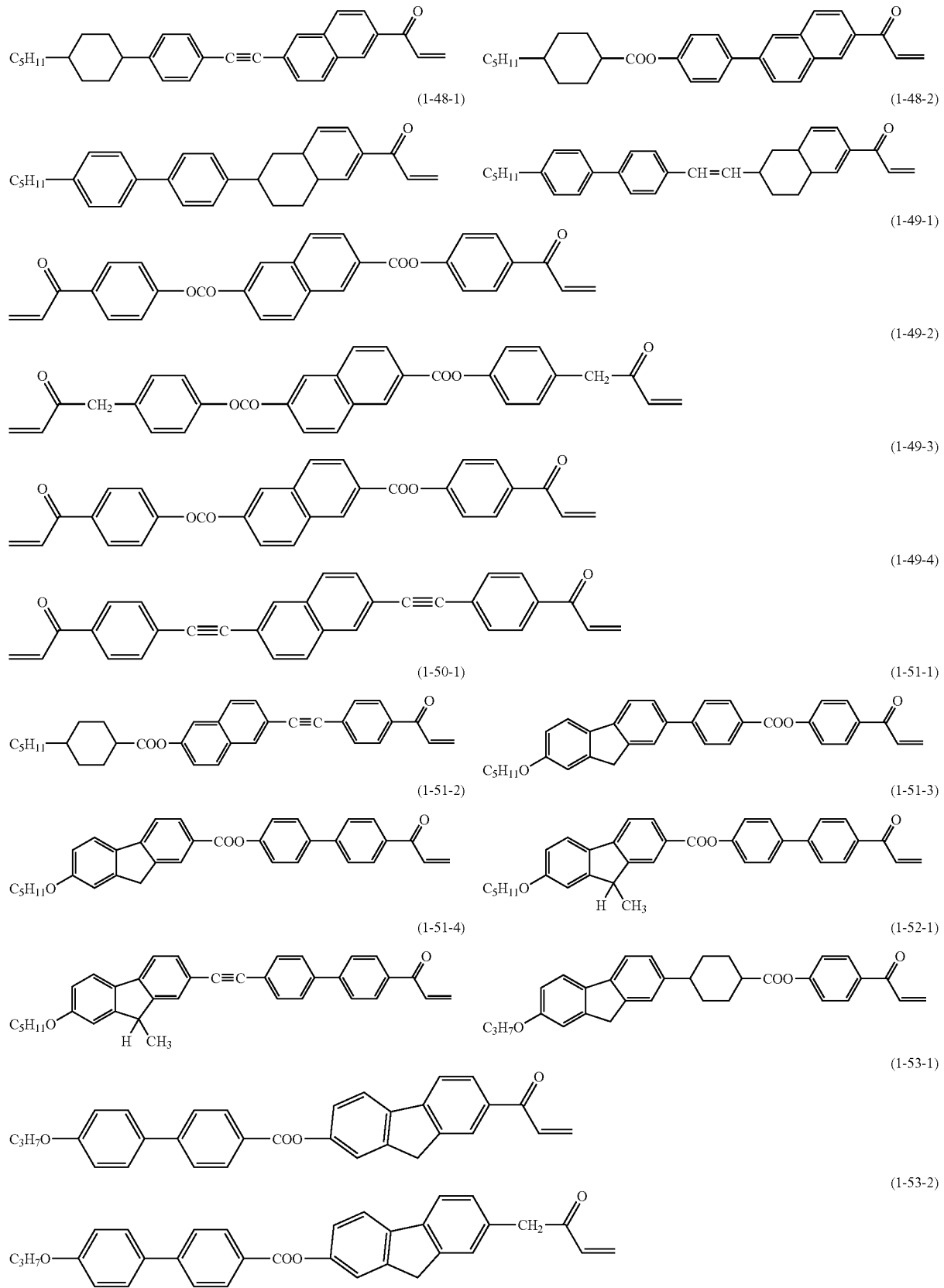

-continued
(1-54-1)
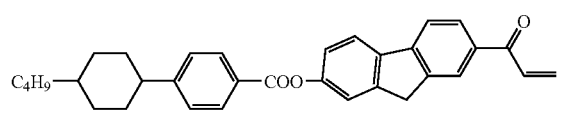
(1-54-2)
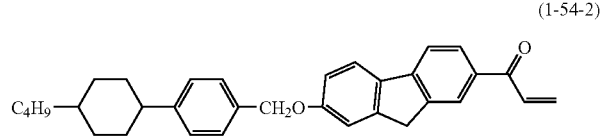
(1-54-3)
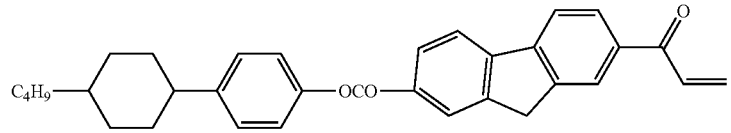
(1-55-1)
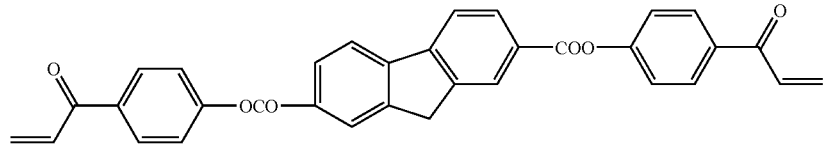
(1-55-2)
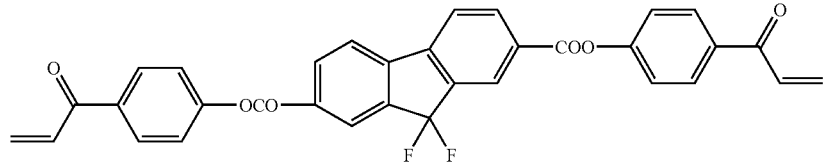
(1-55-3)
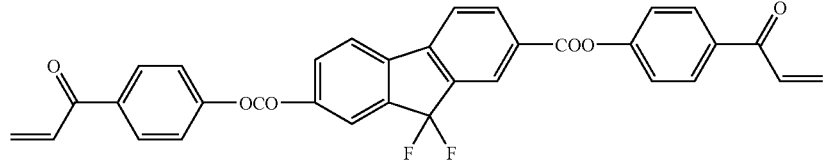
(1-55-4)
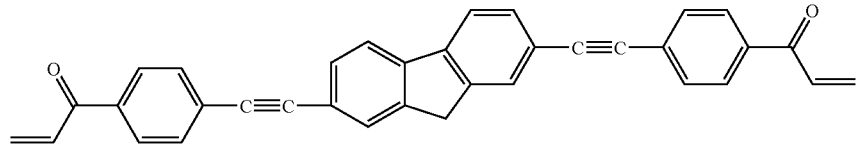
(1-55-5)
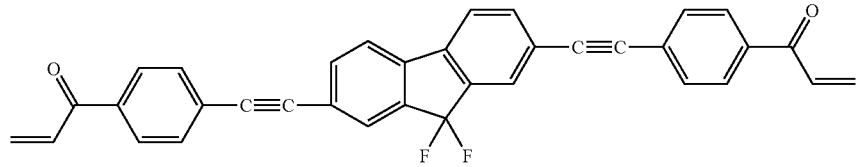
(1-55-6)
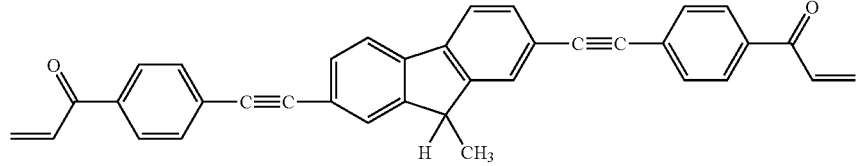
(1-56-1)
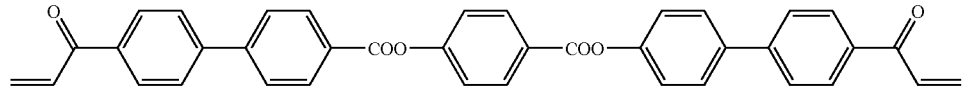
(1-56-2)
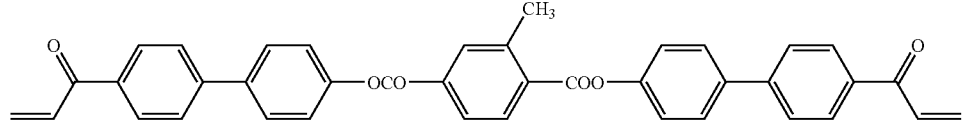

-continued

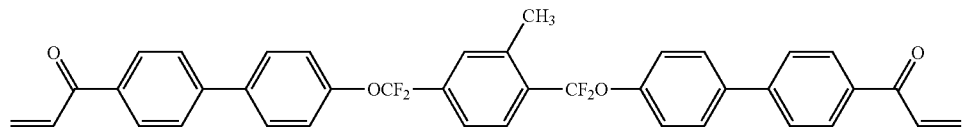
(1-56-3)

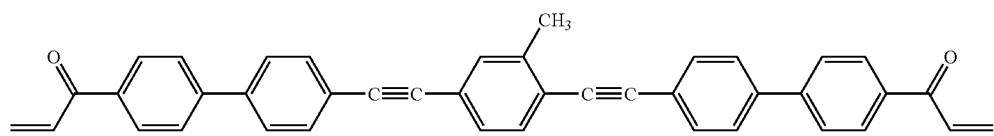
(1-56-4)

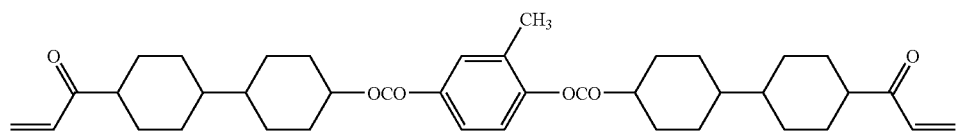
(1-57-1)

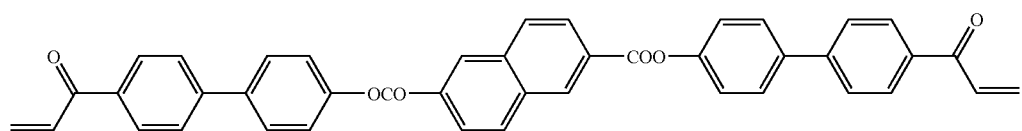
(1-58-1)

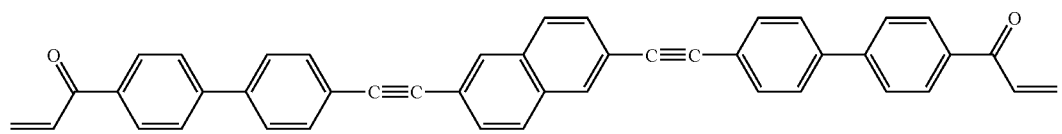
(1-58-2)

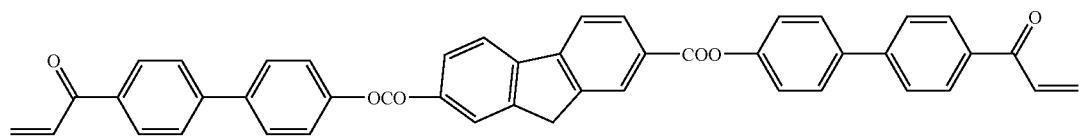
(1-59-1)

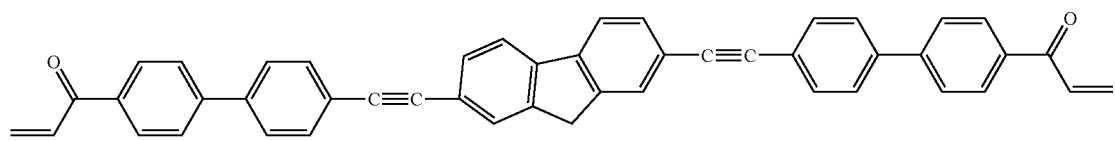
(1-59-2)

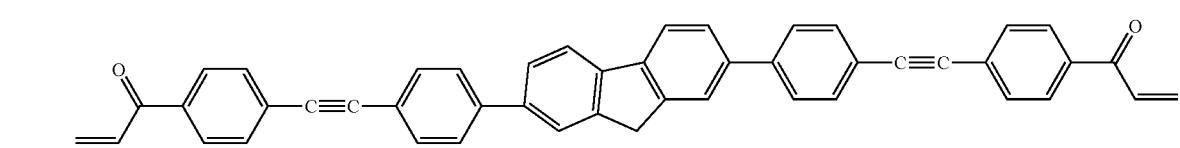
(1-59-3)

Example 8

3 parts by weight of a photopolymerization initiator Irgacure 907 (trade name by Ciba Speciality Chemicals) was added to 100 parts by weight of compound (1-5-11). The photopolymerization initiator-containing, polymerizable compound was dissolved in 412 parts by weight of cyclopentanone to prepare a solution having a concentration of 20% by weight. Using a bar coater capable of forming a film having a wet thickness of about 12 μm, the solution was applied onto a glass substrate coated with an oriented polyimide film that had been oriented by rubbing. This was put on a hot plate heated at 65° C. for 120 seconds to attain solvent evaporation and molecular orientation. Still heated on the hot plate at 65° C., this was exposed to light of 30 mW/cm² (having a center wavelength of 365 nm) from an ultra-high pressure mercury lamp of 250 W/cm, for 20 seconds, and was polymerized in a nitrogen atmosphere. Thus formed, the thin optical film was observed with a polarizing microscope, which confirmed that the film is a uniform alignment film with no orientation defect. The retardation of the film measured with a Berek compensator was 60 nm.

Example 9

3 parts by weight of a photopolymerization initiator Irgacure 907 (trade name by Ciba Speciality Chemicals) was added to a polymerizable composition comprised of 30 parts by weight of compound (1-5-11), 30 parts by weight of compound (1-13-8) and 40 parts by weight of compound (OP-15). The photopolymerization initiator-containing, polymerizable composition was dissolved in 412 parts by weight of cyclopentanone to prepare a solution having a concentration of 20% by weight. Using a bar coater capable of forming a film having a wet thickness of about 12 μm, the solution was applied onto a glass substrate coated with an oriented polyimide film that had been oriented by rubbing. This was put on a hot plate heated at 70° C. for 120 seconds to attain solvent evaporation and molecular orientation. Still heated on the hot plate at 70° C., this was exposed to light of 30 mW/cm$^2$ (having a center wavelength of 365 nm) from an ultra-high pressure mercury lamp of 250 W/cm, for 20 seconds, and was polymerized in a nitrogen atmosphere. Thus processed, this gave a thin optical film having the ability to selectively reflect red.

Example 10

3 parts by weight of a photopolymerization initiator Irgacure 907 (trade name by Ciba Speciality Chemicals) was added to a composition comprised of 80 parts by weight of compound (1-5-11) prepared in Example 1, 5 parts by weight of 4-(trans-4-propylcyclohexyl)cyanobenzene, 5 parts by weight of 4-(trans-4-pentylcyclohexyl)cyanobenzene, 5 parts by weight of 4-(trans-4-heptylcyclohexyl) cyanobenzene and 5 parts by weight of 4'-(trans-4-heptylcyclohexyl) cyanobiphenyl. The photopolymerization initiator-containing, composition was dissolved in 412 parts by weight of cyclopentanone to prepare a solution having a concentration of 20% by weight. Using a bar coater capable of forming a film having a wet thickness of 12 μm, the solution was applied onto a glass substrate coated with an oriented polyimide film that had been oriented by rubbing. This was put on a hot plate heated at 60° C. for 120 seconds to attain solvent evaporation and molecular orientation. Still heated on the hot plate at 60° C., this was exposed to light of 30 mW/cm$^2$ (having a center wavelength of 365 nm) from an ultra-high pressure mercury lamp of 250 W/cm, for 20 seconds, and was polymerized in a nitrogen atmosphere. Thus formed, the thin optical film was observed with a polarizing microscope, which confirmed that the film is a uniform alignment film with no orientation defect. The retardation of the film measured with a Berek compensator was 55 nm.

Example 11

Compound (1-5-11) (10 mg) prepared in Example 1, azobiscyclohexanecarbonitrile (0.1 mg) and benzene (100 μL) were put into a glass ampoule. This was cooled to −60° C. and well degassed via a vacuum pump, and then sealed up. The ampoule was heated in a water bath at 70° C. for 24 hours. The resulting reaction mixture was reprecipitated three times from methanol (15 mL) to obtain a polymer (8.1 mg). Measured through GPC, the weight-average molecular weight (Mw) of the polymer was 29,000 and the degree of polydispersity (Mw/Mn) thereof was 1.99. The polymer (1.025 mg) was dipped in pure water (1 mL) at 50° C. and kept as such for 10 days. The polymer was taken out and well dried, and its weight was measured and was 1.028 mg. This confirms that the water absorption of the polymer is low.

Example 12

The polymer (5 mg) prepared in Example 10 was dissolved in NMP (N-methylpyrrolidone, 1.0 ml), and applied onto two glass plates that had been well washed, in a mode of spin coating to form a uniform polymer film thereon. Thus coated, the glass plates were heated at 150° C. for 3 hours to remove the solvent. The two glass plates were rubbed with a roller fitted with a rubbing cloth, both in one direction. The two glass plates were combined with their rubbing direction being the same to construct a cell of which the space between the two plates was 10 μm. Merck's liquid-crystal composition ZLI-1132 (trade name) was injected into the cell at room temperature. In the cell, the liquid-crystal composition showed homogeneous orientation.

Comparative Example 1 t-BuOK (5.7 g) was added to DMSO (100 mL) that had been distilled on calcium hydride and completely dried, and stirred for 10 minutes to obtain a white suspension. Kept at 5° C., 2-chloroethyl 4-methoxyphenyl ketone (9.9 g) prepared in Example 1 (Step 1) was slowly and dropwise added to it. The reaction mixture immediately became black. This was stirred for 5 hours at the same temperature, and then the reaction mixture was poured into water (500 mL) and extracted with diethyl ether. The solvent was evaporated away under reduced pressure, and the residue was analyzed through NMR and GC. No spectrum derived from the intended 4-methoxyphenyl vinyl ketone was found, and only a complicated mixture was obtained.

EFFECTS OF THE INVENTION

The compound of the invention has a broad temperature range for its liquid-crystal phase and is well compatible with other compounds. In addition, the compound has the necessary characteristics such as optical anisotropy, and is usable in liquid-crystal composition. The polymer of the invention has many good characteristics of transparency, mechanical strength, coatability, solubility, crystallinity, shrinkage, water permeability, water absorption, melting point, glass transition point, clearing point and chemical resistance, and it may be formed into optically-anisotropic materials.

What is claimed is:
1. A compound of formula (1):

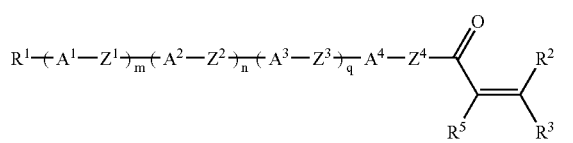

(1)

wherein $R^1$ represents halogen, —CN, —CF$_3$, —CF$_2$H, —CFH$_2$, —OCF$_3$, —OCF$_2$H, —N═C═O, —N═C═S, or alkyl having from 1 to 20 carbon atoms, and any —CH$_2$— of the alkyl may be substituted with —O—, —S—, —CO—, —COO—, —OCO—, —CH═CH—, —CF═CF— or —C≡C—, and any hydrogen thereof may be substituted with halogen or —CN; $R^2$, $R^3$ and $R^5$ each independently represent hydrogen or alkyl having from 1 to 3 carbon atoms; $A^1$, $A^2$, $A^3$ and $A^4$ each independently represent 1,4-cyclohexylene, 1,4-cyclohexenylene, 1,4-phenylene, naphthalene-2,6-diyl, tetrahydronaphthalene-2,6-diyl, fluorene-2,7-diyl, bicyclo[2.2.2]octane-1,4-diyl or bicyclo[3.1.0]hexane-3,6-diyl, and in these rings, any —CH$_2$— may be substituted with —O—, and any —CH═ may be substituted with —N═, and in these rings, any hydrogen may be substituted with halogen or alkyl having from 1 to 5 carbon atoms;

$Z^1$, $Z^2$ and $Z^3$ each independently represent a single bond, —(CH$_2$)$_a$—, —O(CH$_2$)$_a$—, —(CH$_2$)$_a$O—, —O(CH$_2$)$_a$O—, —CH═CH—, —C≡C—, —COO—, —OCO—, —(CF$_2$)$_2$—, —C≡C—COO—, —OCO—C≡C—, —CH=CH—(CH$_2$)$_2$—, —(CH$_2$)$_2$—CH=CH—, —CF=CF—, —C≡C—HC=CH—, or —CH=CH—C≡C—, and a indicates an integer of from 1 to 20; $Z^4$ represents a single bond or α,ω-alkylene having from 1 to 4 carbon atoms, and when $Z^4$ represents α,ω-alkylene having 3 or 4 carbon atoms, the —CH$_2$— thereof directly bonded with $A^4$ may be substituted with —O—, —S—, —COO— or —OCO—; m, n and q each independently indicates 0, 1 or 2, but m+n+q≧1;

wherein when m+n+q=1, any —CH$_2$— of the alkyl represented by $R^1$ is not substituted with —CO— and $Z^4$ is a single bond;

when m+n+q=1, $Z^4$ is a single bond and $A^4$ represents 1,4-phenylene, $Z^1$, $Z^2$ and $Z^3$ each is not a single bond; and when m+n+q=2, $A^1$, $A^2$, $A^3$ and $A^4$ are 1,4-phenylene and $Z^1$, $Z^2$, $Z^3$ and $Z^4$ are single bonds, any —CH$_2$— of the alkyl represented by $R^1$ is not substituted with —CO—.

2. A compound as claimed in claim 1, in which $R^5$ in formula (1) is hydrogen.

3. A compound as claimed in claim 2, in which $R^2$ and $R^3$ in formula (1) in claim 1 are hydrogen.

4. A compound as claimed in claim 3, in which $A^1$, $A^2$, $A^3$ and $A^4$ in formula (1) in claim 1 are independently any of 1,4-cyclohexylene or 1,4-phenylene, and any hydrogen in these rings may be substituted with halogen.

5. A compound as claimed in claim 3, in which $A^1$, $A^2$, $A^3$ and $A^4$ in formula (1) in claim 1 are independently any of 1,4-cyclohexylene or 1,4-phenylene, and any hydrogen in these rings may be substituted with halogen; and $Z^1$, $Z^2$ and $Z^3$ are independently any of a single bond, —(CH$_2$)$_a$—, —O(CH$_2$)$_a$—, —(CH$_2$)$_a$O—, —O(CH$_2$)$_a$O—, —CH=CH—, —C≡C—, —COO—, or —OCO—.

6. A compound as claimed in claim 5, in which $Z^4$ in formula (1) in claim 1 is a single bond.

7. Any one compound of formulae (a) to (d):

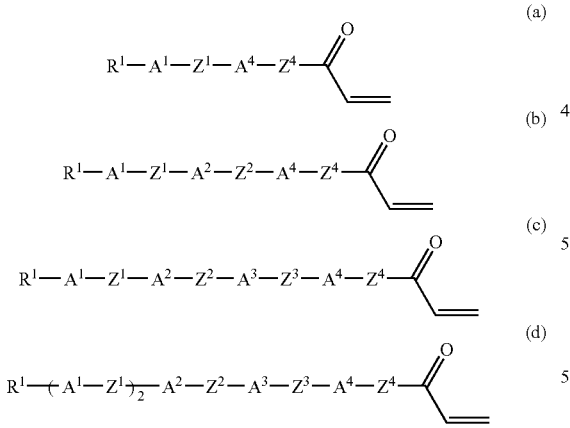

wherein $R^1$ represents hydrogen, halogen, —CN, —CF$_3$, —CF$_2$H, —CFH$_2$, —OCF$_3$, —OCF$_2$H, —N=C=O, —N=C=S, or alkyl having from 1 to 20 carbon atoms, and any —CH$_2$— of the alkyl may be substituted with —O—, —S—, —CO—, —COO—, —OCO—, —CH=CH—, —CF=CF— or —C≡C—, and any hydrogen thereof may be substituted with halogen or —CN; $A^1$, $A^2$, $A^3$ and $A^4$ each independently represent 1,4-cyclohexylene, 1,4-cyclohexenylene, 1,4-phenylene, naphthalene-2,6-diyl, tetrahydronaphthalene-2,6-diyl, fluorene-2,7-diyl, bicyclo[2.2.2]octane-1,4-diyl or bicyclo[3.1.0]hexane-3,6-diyl, and in these rings, any —CH$_2$— may be substituted with —O—, and any —CH= may be substituted with —N=, and in these rings, any hydrogen may be substituted with halogen or alkyl having from 1 to 5 carbon atoms; $Z^1$, $Z^2$ and $Z^3$ each independently represent a single bond, —(CH$_2$)$_a$—, —O(CH$_2$)$_a$—, —(CH$_2$)$_a$O—, —O(CH$_2$)$_a$O—, —CH=CH—, —C≡C—, —COO—, —OCO—, —(CF$_2$)$_2$—, —C≡C—COO—, —OCO—C≡C—, —CH=CH—(CH$_2$)$_2$—, —(CH$_2$)$_2$—CH=CH—, —CF=CF—, —C≡C—HC=CH—, or —CH=CH—C≡C—, and a indicates an integer of from 1 to 20; $Z^4$ represents a single bond or α,ω-alkylene having from 1 to 4 carbon atoms, and when $Z^4$ represents α,ω-alkylene having 3 or 4 carbon atoms, the —CH$_2$— thereof directly bonded with $A^4$ may be substituted with —O—, —S—, —COO— or —OCO—, and wherein in formula (a), any —CH$_2$— of the alkyl represented by $R^1$ not substituted with —CO—, $z^4$ is a single bond, and $Z^1$ is not a single bond when $A^4$ represents 1,4-phenylene; and in formula (b), when $A^1$, $A^2$ and $A^4$ are 1,4-phenylene and $Z^1$, $Z^2$ and $Z^4$ are single bonds, any —CH$_2$— of the alkyl represented by $R^1$ is not substituted with —CO—.

8. A compound as claimed in claim 7, in which $R^1$ in formulae (a) to (d) is hydrogen, halogen, —CN, —CF$_3$, —CF$_2$H, —CFH$_2$, —OCF$_3$, —OCF$_2$H, alkyl having from 1 to 10 carbon atoms, alkoxy having from 1 to 10 carbon atoms, alkoxyalkyl having from 2 to 10 carbon atoms, or alkenyl having from 2 to 10 carbon atoms; $A^1$, $A^2$, $A^3$ and $A^4$ are independently any of 1,4-cyclohexylene or 1,4-phenylene, and in these rings, any hydrogen may be substituted with halogen; $Z^1$, $Z^2$ and $Z^3$ are independently any of a single bond, —(CH$_2$)$_2$—, —(CH$_2$)$_4$—, —OCH$_2$—, —O(CH$_2$)$_3$—, —CH$_2$O—, —(CH$_2$)$_3$O—, —O(CH$_2$)$_2$O—, —CH=CH—, —C≡C—, —COO—, —OCO—, —(CF$_2$)$_2$—, or —CF=CF—; $Z^4$ is a single bond.

9. A liquid-crystal composition containing at least two polymerizable compounds, in which at least one polymerizable compound is the compound of claim 1.

10. A liquid-crystal composition, which contains at least two polymerizable compounds in which all the polymerizable compounds the compounds of of claims 1.

11. A liquid-crystal composition, which contains at least two polymerizable compounds that comprise at least one compound of claims 1 and at least one polymerizable compound except the compound.

12. A liquid-crystal composition as claimed in claim 9, which additionally contains an optically-active compound.

13. A polymer having a constitutional unit of formula (2):

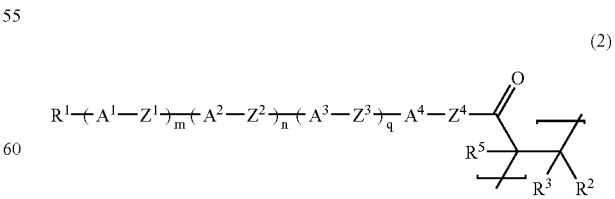

wherein $R^1$ represents hydrogen, halogen, —CN, —CF$_3$, —CF$_2$H, —CFH$_2$, —OCF$_3$, —OCF$_2$H, —N=C=O, —N=C=S, or alkyl having from 1 to 20 carbon atoms, and any —CH$_2$— of the alkyl may be substituted with —O—, —S—, —CO—, —COO—, —OCO—, —CH═CH—, —CF═CF— or —C≡C—, and any hydrogen thereof may be substituted with halogen or —CN; $R^2$, $R^3$ and $R^5$ each independently represent hydrogen or an alkyl having from 1 to 3 carbon atoms; $A^1$, $A^2$, $A^3$ and $A^4$ each independently represent 1,4-cyclohexylene, 1,4-cyclohexenylene, 1,4-phenylene, naphthalene-2,6-diyl, tetrahydronaphthalene-2,6-diyl, fluorene-2,7-diyl, bicyclo[2.2.2]octane-1,4-diyl or bicyclo[3.1.0]hexane-3,6-diyl, and in these rings, any —$CH_2$— may be substituted with —O—, and any —CH═ may be substituted with —N═, and in these rings, any hydrogen may be substituted with halogen or alkyl having from 1 to 5 carbon atoms; $Z^1$, $Z^2$ and $Z^3$ each independently represent a single bond, —$(CH_2)_a$—, —$O(CH_2)_a$—, —$(CH_2)_aO$—, —$O(CH_2)_aO$—, —CH═CH—, —C≡C—, —COO—, —OCO—, —$(CF_2)_2$—, —C≡C—COO—, —OCO—C≡C—, —CH═CH—$(CH_2)_2$—, —$(CH_2)_2$—CH═CH—, —CF═CF—, —C≡C—HC═CH—, —CH═CH—C≡C—, —$OCF_2$—, or —$CF_2O$—, and a indicates an integer of from 1 to 20; $Z^4$ represents a single bond or α,ω-alkylene having from 1 to 4 carbon atoms, and any —$CH_2$— of the alkylene may be substituted with —O—, —S—, —COO— or —OCO—; and m, n and q each independently indicate 0, 1 or 2;and wherein when m+n+q=1, any —$CH_2$ of the alkyl represented by $R^1$ is not substituted with —CO— and $Z^4$ is a single bond; and when n+m+q=2, $A^1$, $A^2$, $A^3$ and $A^4$ are 1,4-phenylene and $Z^1$, $Z^2$, $Z^3$ and $Z^4$ are single bonds, any —$CH_2$— of the alkyl represented by $R^1$ is not substituted with —CO—.

14. A polymer as claimed in claim 13, in which $R^5$ in formula (2) is hydrogen.

15. A polymer as claimed in claim 13, in which $R^2$, $R^2$, $R^3$ and $R^5$ R are hydrogen.

16. A polymer as claimed in claim 13, in which $R^2$, $R^3$ and $R^5$ are hydrogen; $A^1$, $A^2$, $A^3$ and $A^4$ are independently any of 1,4-cyclohexylene or 1,4-phenylene, and any hydrogen in these rings may be substituted with halogen.

17. A polymer as claimed in claim 13, in which $R^2$, $R^3$ and $R^5$ are hydrogen; $A^1$, $A^2$, $A^3$ and $A^4$ are independently any of 1,4-cyclohexylene or 1,4-phenylene, and any hydrogen in these rings may be substituted with halogen; and $Z^1$, $Z^2$ and $Z^3$ are independently any of a single bond, —$(CH_2)_a$—, —$O(CH_2)_a$—, —$(CH_2)_aO$—, —$O(CH_2)_aO$—, —CH═CH—, —C≡C—, —COO—, —OCO—, —$OCF_2$—, or —$CF_2O$—.

18. A polymer as claimed in claim 13, in which $R^2$, $R^3$ and $R^5$ are hydrogen; $A^1$, $A^2$, $A^3$ and $A^4$ are independently any of 1,4-cyclohexylene or 1,4-phenylene, and any hydrogen in these rings may be substituted with halogen; $Z^1$, $Z^2$ and $Z^3$ are independently any of a single bond, —$(CH_2)_a$—, —$O(CH_2)_a$—, —$(CH_2)_aO$—, —$O(CH_2)_aO$—, —CH═CH—, —C≡C—, —COO—, —OCO—, —$OCF_2$—, or —$CF_2O$—, and $Z^4$ is a single bond.

19. A polymer as claimed in claim 13, in which $R^1$ in formula (2) is hydrogen, halogen, —CN, —$CF_3$, —$CF_2H$, —$CFH_2$, —$OCF_3$, —$OCF_2H$, alkyl having from 1 to 10 carbon atoms, alkoxy having from 1 to 10 carbon atoms, alkoxyalkyl having from 2 to 10 carbon atoms, or alkenyl having from 2 to 10 carbon atoms; $R^2$, $R^3$ and $R^5$ are hydrogen; $A^1$, $A^2$, $A^3$ and $A^4$ are independently any of 1,4-cyclohexylene or 1,4-phenylene, and in these rings, any hydrogen may be substituted with halogen; $Z^1$, $Z^2$ and $Z^3$ are independently any of a single bond, —$(CH_2)_2$—, —$(CH_2)_4$—, —$OCH_2$—, —$O(CH_2)_3$—, —$CH_2O$—, —$(CH_2)_3O$—, —$O(CH_2)_2O$—, —CH═CH—, —C≡C—, —COO—, —OCO—, —$(CF_2)_2$—, —CF═CF—, —$OCF_2$— or —$CF_2O$—; $Z^4$ is a single bond.

20. A polymer as claimed that is obtained through homopolymerization of one compound of claim 1 and has a constitutional unit of formula (2):

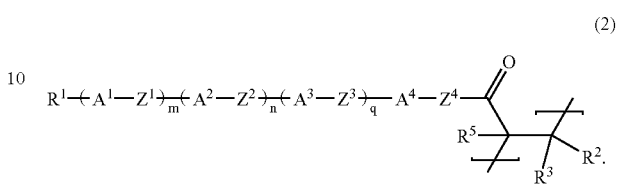

21. A polymer that is obtained from the liquid-crystal composition of claim 9 and has a constitutional unit of formula (2):

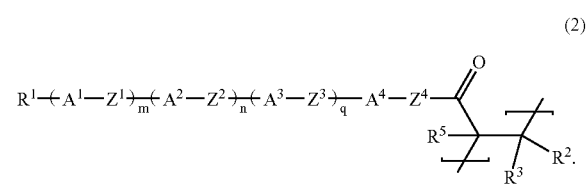

22. An optically-anisotropic material of the polymer of claim 13.

23. A liquid-crystal display device, which contains the polymer of claim 13.

24. A liquid-crystal display device, which contains the optically-anisotropic material of claim 22.

25. A method for producing a vinyl ketone compound of formula (1b), which comprises reacting one molar equivalent of a compound of formula (1a) with from 1 to 10 molar equivalents of a Lewis acid at −70° C. to 200° C., followed by dehydrohalogenating the resulting compound:

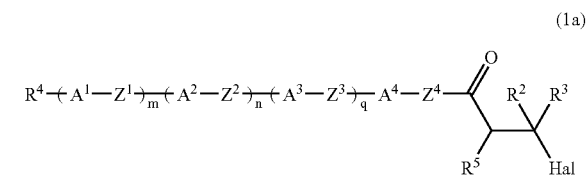

wherein $R^4$ represents hydrogen, halogen, —OH, —CN, —$CF_3$, —$CF_2H$, —$CFH_2$, —$OCF_3$, —$OCF_2H$, —N═C═O, —N═C═S, or alkyl having from 1 to 20 carbon atoms, and any —$CH_2$— of the alkyl may be substituted with —O—, —S—, —CO—, —COO—, —OCO—, —CH═CH—, —CF═CF— or —C≡C—, and any hydrogen thereof may be substituted with halogen or —CN; $R^2$, $R^3$ and $R^5$ each independently represent hydrogen or an alkyl having from 1 to 3 carbon atoms; $A^1$, $A^2$, $A^3$ and $A^4$ each independently represent 1,4-cyclohexylene, 1,4-cyclohexenylene, 1,4-phenylene, naphthalene-2,6-diyl, tetrahydronaphthalene-2,6-diyl, fluorene-2,7-diyl, bicyclo[2.2.2]octane-1,4-diyl or bicyclo[3.1.0]hexane-3,6-diyl, and in these rings, any —$CH_2$— may be substituted with —O—, and any —CH= may be substituted with —N=, and in these rings, any hydrogen may be substituted with halogen or alkyl having from 1 to 5 carbon atoms; $Z^1$, $Z^2$ and $Z^3$ each independently represent a single bond, —$(CH_2)_a$—, —$O(CH_2)_a$—, —$(CH_2)_aO$—, —$O(CH_2)_aO$—, —CH=CH—, —C≡C—, —COO—, —OCO—, —$(CF_2)_2$—, —C≡C—COO—, —OCO—C≡C—, —CH=CH—$(CH_2)_2$—, —$(CH_2)_2$—CH=CH—, —CF=CF—, —C≡C—HC=CH—, —CH=CH—C≡C—, —$OCF_2$— or —$CF_2O$—, and a indicates an integer of from 1 to 20; $Z^4$ represents a single bond or α,ω-alkylene having from 1 to 4 carbon atoms, and any —$CH_2$— of the alkylene may be substituted with —O—, —S—, —COO— or —OCO—; m, n and q each independently indicate 0, 1 or 2; Hal represents chlorine, bromine or iodine, wherein when m+n+q=1, any —$CH_2$— of the alkyl represented by $R^1$ is not substituted with —CO— and $Z^4$ is a single bond; and when m+n+q=2, $A^2$, $A^3$ and $A^4$ are 1,4-phenylene and $Z^1$, $Z^2$, $Z^3$ and $Z^4$ are single bonds, any —$CH_2$— of the alkyl represented by $R^1$ is not substituted with —CO—.

* * * * *